United States Patent
Totsu

(10) Patent No.: US 7,162,939 B2
(45) Date of Patent: Jan. 16, 2007

(54) TAMPERPROOF SCREW, COMBINATION WITH SCREWDRIVER BIT, AND HEADER PUNCH FOR MANUFACTURING TAMPERPROOF SCREW

(76) Inventor: Katsuyuki Totsu, 32-13, Oshigae 1-chome, Sumida-ku, Tokyo (JP)

( * ) Notice: Subject to any disclaimer, the term of this patent is extended or adjusted under 35 U.S.C. 154(b) by 76 days.

(21) Appl. No.: 10/507,263

(22) PCT Filed: Feb. 27, 2003

(86) PCT No.: PCT/JP03/02188

§ 371 (c)(1),
(2), (4) Date: Sep. 10, 2004

(87) PCT Pub. No.: WO03/076815

PCT Pub. Date: Sep. 18, 2003

(65) Prior Publication Data

US 2005/0129486 A1  Jun. 16, 2005

(30) Foreign Application Priority Data

Mar. 12, 2002 (JP) ............................. 2002-066806
May 17, 2002 (JP) ............................. 2002-142770

(51) Int. Cl.
*B25B 15/00* (2006.01)
(52) U.S. Cl. .................... 81/460; 81/461; 411/403; 411/405
(58) Field of Classification Search ............... 81/460, 81/461; 411/403–405, 407, 919, 910
See application file for complete search history.

(56) References Cited

U.S. PATENT DOCUMENTS 2,216,381 A * 10/1940 West et al. ................. 411/410
2,400,684 A *  5/1946 Clark ........................... 81/460
4,202,244 A *  5/1980 Gutshall ...................... 411/404

(Continued)

FOREIGN PATENT DOCUMENTS

DE  195 37 992  4/1997

(Continued)

*Primary Examiner*—David B. Thomas
*Assistant Examiner*—Robert Scruggs
(74) *Attorney, Agent, or Firm*—Koda & Androlia

(57) ABSTRACT

Related to a tamperproof screw to which a conventional general screwdriver cannot couple so that screw tightening is prevented reliably, to a screwdriver bit that can be simply and quickly coupled to the screw and can reliably prevent a come-out phenomenon during screw tightening, and to a header punch for manufacturing the tamperproof screw simply, easily and at low costs. A tamperproof screw (10A) has: inclined portions (15) that extends from the opening end edge portions (12a) of the bit fitting grooves of a screw head (10a) toward a center portion of the screw neck portion (10b), step portions (14) provided at intermediate point of the inclined portion, a conical bottom surface (13) formed at the center portion where the inclined portions meet, and an inverted truncated cone shape hole portion (16) that reaches the bottom surface as a continuation, except for the step portions (14), of the inclined portions so that the open end edge portions of the bit engaging grooves take the maximum diameter of the inverted truncated cone shape hole portion. The thus structured tamperproof screw (10A), a screwdriver bit that matches the screw, and a header punch for manufacturing the tamperproof screw are provided.

9 Claims, 16 Drawing Sheets

U.S. PATENT DOCUMENTS

| | | | | |
|---|---|---|---|---|
| 5,641,258 A | * | 6/1997 | Sala | 411/404 |
| 5,765,980 A | * | 6/1998 | Sudo et al. | 411/404 |
| 6,293,745 B1 | * | 9/2001 | Lu | 411/410 |
| 6,341,546 B1 | * | 1/2002 | Totsu | 81/460 |
| 6,378,406 B1 | * | 4/2002 | Totsu | 81/460 |
| 6,584,876 B1 | * | 7/2003 | Totsu | 81/460 |
| 6,626,067 B1 | * | 9/2003 | Iwinski et al. | 81/121.1 |
| 6,886,433 B1 | * | 5/2005 | Totsu | 81/460 |
| 6,890,139 B1 | * | 5/2005 | Hughes | 411/403 |
| 2002/0029666 A1 | * | 3/2002 | Totsu | 81/460 |
| 2003/0059276 A1 | * | 3/2003 | Chen | 411/403 |

FOREIGN PATENT DOCUMENTS

| | | |
|---|---|---|
| JP | 55-80512 | 6/1980 |
| JP | 6-30514 | 4/1994 |
| JP | 9-177743 | 7/1997 |
| JP | 11-236910 | 8/1999 |
| JP | 11-270529 | 10/1999 |
| JP | 11-311226 | 11/1999 |
| JP | 2000-108043 | 4/2000 |
| JP | 2000-220619 | 8/2000 |
| JP | 3074989 | 11/2000 |
| WO | WO 99/43472 | 9/1999 |

* cited by examiner (a)

(b)

(a)

(b)

TAMPERPROOF SCREW, COMBINATION WITH SCREWDRIVER BIT, AND HEADER PUNCH FOR MANUFACTURING TAMPERPROOF SCREW

TECHNICAL FIELD

The present invention relates to a tamperproof screw which is constructed so that when a common commercially marketed screwdriver whose bit tip end is formed as a plus type end or minus type end or a screwdriver whose bit tip end is formed in a polygonal shape such as a hexagonal shape, etc. (a screw turning tool) is coupled with a screw that has bit engaging grooves of a respectively corresponding shape formed in the screw head, an engagement of the bit engaging grooves formed in the screw head with a bit tip end portion of the corresponding screwdriver is prevented thus prohibiting tightening and removal of the screw, and to a screwdriver bit that can be suitably used on this tamperproof screw, and further to a header punch for manufacturing this tamperproof screw.

BACKGROUND ART

Conventionally, a device in which various types of parts are joined or assembled by screw attachment has problems. In cases where the screws are unnecessarily removed by a third party, the device is disassembled or its parts are removed, resulting in that adjustment sections or dangerous sections are exposed, and it becomes difficult to restore the device to its original functioning state, and in addition emergency situations would occur. From such a standpoint, various types of tamperproof screws that cannot easily be tightened or removed by a common commercially marketed screwdriver (screw turning tool) have been conventionally proposed in the past.

One that has been proposed as a tamperproof screw of this type is, for example, a screw in which a plurality of fan-shaped projections that are equally divided by straight lines in the radial direction are formed in the upper surface of the circular head, and this surface is used as a one-way rotational screw surface, so that an ordinary screwdriver cannot be engaged with the screw, and the screw is tightened utilizing the vertical surface formed on the end surface of one of the fan-shaped projections only in cases where a special tool is used. (Japanese Patent Application Laid Open (Kokai) No. 2000-220619).

Furthermore, in the special tool that is used for the above-described tamperproof screw, a circular hollow space with which the circular head of the tamperproof screw engages is formed in the tip end head of the tool main body, and a plurality of fan-shaped projections having a shape that corresponds in a male-female relationship to the fan-shaped projections formed on the circular head of the tamperproof screw are provided inside this circular hollow space.

Furthermore, a special bolt and special nut, which cannot easily be rotated by means of a commonly used tool so that there is no danger of these elements being easily rotated by a third party, and a tightening device, which is comprised of these special bolt and nut, have been proposed (Japanese Patent Application Laid Open (Kokai) No. H11-270529).

In the structure of this special bolt according to the proposal of this prior art, a truncated cone shape head whose external diameter becomes gradually smaller toward the tip end is concentrically formed at one end portion of the shank that has screw grooves formed on other end portion thereof, an engaging hollow space which has the cross-sectional shape of a regular pentagon in which the respective corner portions are formed in a circular arc shape is formed in the tip end of this head so that the hollow space opens toward the tip end surface of the head, and a truncated cone shape projection whose external diameter becomes gradually smaller toward the tip end is formed inside this engaging hollow space.

Accordingly, since the head of the special bolt constructed in this manner has the shape of a truncated cone with a diameter that becomes gradually smaller toward the tip end, even if it is attempted to engage an ordinary tool such as wrench or spanner, etc. with this head, this tool readily slips off toward the tip end without engaging with the head. In other words, a tamperproof effect against third parties can be effectively manifested.

Furthermore, the special tool that can be engaged with this special bolt so that the bolt can be rotated has a structure in which the tool is comprised of a tool main body, which has the shape of a hexagonal column, and a head, which is disposed on one end of this tool main body. The head is in the shape of a regular pentagonal column which has outer circumferential faces that match the inner circumferential surfaces of the engaging hollow space in the head of the special bolt. A through-hole having an internal diameter that allows engagement with the projection on the head of the special bolt is formed in the axial central portion of this head. The through-hole has a constant internal diameter over the entire length of the special tool, and the axial central portion of the tool main body also passes through. Accordingly, in this special tool, the head can be engaged with the engaging hollow space of the special bolt, and the special bolt can easily be rotated as a result.

Furthermore, in common combinations of a screw and a screwdriver bit used in the past, a cruciform groove is formed in the head of the screw, and this cruciform groove is formed so that substantially constant inclined portions extend respectively from the respective open end edge portion toward the central portion of the neck portion of the screw, and a substantially conical bottom surface with a gradual inclination is formed in the bottom of this cruciform groove. Meanwhile, a conventional screwdriver bit comprises respective tip end vane portions that engage with the cruciform groove of the screw and has a structure in which projections are formed respectively to extend so as to match the shapes of the inclined portions that extend from the open end edge portion of the cruciform groove toward the central portion of the neck portion of the screw.

In the combination of the conventional screw and screwdriver bit having such structures described above, tapered side wall portions formed on the respective tip end vane portions of the screwdriver bit contact and engage with tapered side wall portions formed in the cruciform groove of the screw; accordingly, when the screwdriver bit is rotated in a particular direction, the state of contact between the screwdriver bit and cruciform groove is in tapered contact as a whole. Consequently, a so called "come-out" phenomenon occurs, in which the tip end of the screwdriver bit tends to jump to the outside along the inclined surfaces of the inclined portions of the cruciform groove. Accordingly, when this come-out phenomenon occurs, not only are the open end edge portion of the cruciform groove of the screw damaged, but also the widening of such damage causes the come-out phenomenon to become even more prevalent, and problems such as the impossibility of performing screw tightening work, etc. arise.

From such a standpoint, the applicant of the present invention previously succeeded in developing a new screw in which the come-out phenomenon of the screwdriver bit is assuredly prevented, the strength of the screw is high so that damage to the screw is conspicuously reduced, and a balanced torque with respect to the screw is obtained, by forming step portions that are oriented substantially at right angles in intermediate point of the respective inclined portions of the bit engaging grooves, and causing a portion of the screwdriver bit to engage with these step portions, in a screw in which bit engaging grooves consisting of a cruciform groove is formed in the screw head, specified inclined portions are formed so as to be oriented toward the central portion of the neck portion of the screw from the end edge portions of this bit engaging grooves, and the central portion where these inclined portions meet has a substantially conical bottom surface (Japanese Patent Application Laid Open (Kokai) No. H9-177743, Japanese Patent Application Laid Open (Kokai) No. H11-236910, Japanese Patent Application Laid Open (Kokai) No. H11-311226, Japanese Patent Application Laid Open (Kokai) No. 2000-108043, etc.).

In this case, furthermore, for the screwdriver bit, it was possible to form a structure most suited to the bit engaging grooves of the screw by way of forming vane portions having substantially perpendicular end edge portions that engage with the step portions formed in intermediate point of the bit engaging grooves of the screw and by way of forming, on the respective vane portions, protruding portions whose tip ends respectively extend so as to conform to the shape of the groove portions that extend from the step portions.

Accordingly, it was ascertained that if a combination of a screw and screwdriver bit having the above-described structures is used, the formation of the bit engaging grooves can easily be accomplished without lowering the strength of the screw, especially in cases where this combination is applied to screws used in compact light-weight precision instruments. Furthermore, it was found that the come-out phenomenon of the screwdriver bit is assuredly prevented and that torque transmission that is balanced with respect to the screw is accomplished, resulting in that proper and safe screw tightening work can always be accomplished.

However, compared to the conventional ordinary combination of screw and screwdriver, the above-described tamperproof screw has extremely complicated special shapes in the respective structures of both the engaging portion of the screw head and the tip end portion of the screwdriver bit that engages with this engaging portion. Accordingly, the manufacture of such a screw and a screwdriver bit requires considerable effort, and the manufacturing cost also becomes high. Furthermore, in this combination of tamperproof screw and screwdriver bit, absolutely no consideration is given to the come-out phenomenon. Accordingly, even if the combination is effective in preventing tampering with the tamperproof screw by means of an ordinary screwdriver, there is no guarantee that tightening and removal of the screw by the proposed combination of tamperproof screw and screwdriver is smoothly accomplished without any come-out phenomenon; and on the contrary, the resulting shape tends to allow the come-out phenomenon to occur.

In view of the above, as a result of diligent research and investigations, the inventor of the present application succeeded in obtaining a new tamperproof screw in which a screw is constructed by forming bit engaging grooves consisting of a cruciform groove in the screw head, by forming inclined portions that have a specified angle of inclination toward the central portion of the neck portion of the screw from the open end edge portions of this bit engaging grooves, by forming respective step portions that are substantially perpendicular in cross section in intermediate point of the inclined portions, and by forming a substantially conical bottom surface in the central portion where the inclined portions meet; and the tamperproof screw is constructed by forming an inverted truncated cone shape hole portion which reaches the bottom surface as a continuation, except for the step portions, of the inclined portions so that the open end edge portions of the bit engaging grooves takes the maximum diameter of the hole portion; so that tightening and removal of the screw by the conventional ordinary plus type screwdriver is assuredly prevented due to the presence of the inverted truncated cone shape hole portion.

On the other hand, for the tamperproof screw that has the structure described above, a screwdriver bit is provided in which vane portions having substantially perpendicular end edge portions that engage with the step portions formed in intermediate point of the inclined portions of bit engaging grooves of the above-described tamperproof screw are respectively formed, and the tip ends of the respective vane portions are formed as protruding portions that are respectively extended so as to conform to the shape of the inverted truncated cone shape hole portion and the inclined portions extending toward the central portion of the neck portion of the screw from the step portions. As a result, it was ensured that tightening and removal of the above-described tamperproof screw could be easily and assuredly accomplished in a quick and simple manner without causing any "come-out" from the bit engaging grooves of the screw.

Furthermore, in the manufacture of the tamperproof screw having the structure described above, a header punch is provided that is comprised of projecting portions, which have substantially perpendicular end edge portions and form the perpendicular and recessed wall portions and step portions in the end edge portions of bit engaging grooves in the screw head of the tamperproof screw, and a conical projecting portion, which forms an inverted truncated cone shape hole portion and inclined portions in the central portion of the bit engaging grooves and to form a substantially conical bottom surface in the tamperproof screw. As a result, it was ensured that the manufacture of the above-described tamperproof screw could be accomplished simply and easily and at a low cost.

Furthermore, as an alternative of the above-described tamperproof screw, a structure can be employed in which an inverted truncated cone shape hole portion that reaches the bottom surface is formed as a continuation, except for the step portions, of the inclined portions so that the open end edge portions of the bit engaging grooves take a maximum diameter of the inverted truncated cone shape hole portion, and a projecting portion is formed so as to protrude from the central portion of the bottom surface to a position above the step portions of the bit engaging grooves. As a result, it was confirmed that tightening and removal of the screw by means of a conventional ordinary plus type screwdriver or minus type screwdriver could also be assuredly prevented because of the presence of the projecting portion and inverted truncated cone shape hole portion.

In this case, for a screwdriver bit that is used for the above tamperproof screw, it has such a structure that a protruding portion is formed by extending the tip ends of the respective vane portions so as to conform to the shape of the inverted truncated cone shape hole portion and the inclined portions that extend from the step portions toward the central portion of the neck portion of the screw, and a hollow space is formed in the center of the tip end of the protruding portion so that the projecting portion is guided thereinto. With this structure, it was confirmed that tightening and removal of the tamperproof screw could be performed easily and assuredly in a quick and simple manner without causing any "come-out" from the bit engaging grooves of the screw.

Furthermore, it was confirmed that the manufacture of the above-described tamperproof screw could be accomplished simply and easily and at a low cost by a header punch that has a structure including a conical projecting portion, which forms an inverted truncated cone shape hole portion and inclined portions in the central portion of the bit engaging grooves and to form a substantially conical bottom surface in the inverted truncated cone shape hole portion, and a cavity portion, which is provided in the center of the tip end of the conical projecting portion and forms a projecting portion in the inverted truncated cone shape hole portion of the tamperproof screw.

Accordingly, the object of the present invention is to provide: a tamperproof screw in which tightening thereof can be assuredly prevented by improving the shape of the bit engaging grooves based upon the structure of a conventional ordinary screw so that coupling by means of a conventional ordinary screwdriver is prevented by a simple structure, a screwdriver bit in which coupling with the tamperproof screw can be accomplished quickly and easily without causing the phenomenon of "come-out" during the tightening of the screw by improving the shape of the tip end of the bit based upon the structure of a conventional screwdriver bit, and a header punch used for manufacturing the tamperproof screw simply and easily and at a low cost.

DISCLOSURE OF INVENTION

In order to accomplish the above-described object, the tamperproof screw of the present invention is comprised of: bit engaging grooves formed in the screw head, inclined portions that have a specified angle of inclination and are formed toward a central portion of a neck portion of the screw from open end edge portions of the bit engaging grooves, step portions that are respectively substantially perpendicular in cross section and are formed in intermediate point of the inclined portions, and a substantially conical bottom surface formed in the central portion where the inclined portions meet; and the tamperproof screw is characterized in that an inverted truncated cone shape hole portion that reaches the bottom surface is formed as a continuation, except for the step portions, of the inclined portions so that the open end edge portions of the bit engaging grooves take a maximum diameter of the inverted truncated cone shape hole portion.

In addition, the tamperproof screw of the present invention is characterized in that: an inverted truncated cone shape hole portion that reaches the bottom surface is formed as a continuation, except for the step portions, of the inclined portions so that the open end edge portions of the bit engaging grooves take a maximum diameter of the inverted truncated cone shape hole portion, and a projecting portion is formed so as to protrude from the central portion of the bottom surface to a position above the step portions of the bit engaging grooves.

In the above tamperproof screw, it is possible to employ a structure in which the inverted truncated cone shape hole portion and the inclined portions that reach the bottom surface from the open end edge portions of the bit engaging grooves have an angle of inclination of substantially 20 to 30° with respect to the axis of the screw.

In addition, the step portions that are formed in intermediate point of the inclined portions of the bit engaging grooves can be respectively formed with wall portions that are recessed inward from a vertical plane over a predetermined depth. Further, the step portions of the bit engaging grooves can have a structure in which the wall portions are recessed in the shape of a substantially shallow V in cross section.

Furthermore, it is possible to employ a structure in which the bit engaging grooves are constructed as a three-way groove that branches in three directions from the central portion of the screw head.

It is further possible to employ a structure in which the bit engaging grooves are formed as a substantially fan-shaped groove in which the groove width increases outward a radial direction from the central portion of the screw head and are constructed so that the opening angles of the facing side wall portions of the respective adjacent grooves is an angle that is slightly more acute than a right angle.

The screw head can be constructed so that the screw head has a pan shape or a dish shape.

Furthermore, in the present invention, it is possible to employ a structure of combination of a tamperproof screw and a screwdriver bit, wherein:

the tamperproof screw is comprised of: bit engaging grooves formed in the screw head of the screw, inclined portions that have a specified angle of inclination and are formed toward a central portion of a neck portion of the screw from an open end edge portions of the bit engaging grooves, step portions that are respectively substantially perpendicular in cross section and are formed in intermediate point of the inclined portions, and a substantially conical bottom surface formed in the central portion where the inclined portions meet; and the tamperproof screw is characterized in that an inverted truncated cone shape hole portion that reaches the bottom surface is formed as a continuation, except for the step portions, of the inclined portions so that the open end edge portions of the bit engaging grooves take a maximum diameter of the inverted truncated cone shape hole portion; and the screwdriver bit is characterized in that the screwdriver bit is comprised of: vane portions having substantially perpendicular end edge portions that engage with the step portions formed in intermediate point of the inclined portions of the bit engaging grooves of the tamperproof screw, and a protruding portion formed by extending the tip ends of the respective vane portions so as to conform to the shape of the inverted truncated cone shape hole portion and the inclined portions that extend from the step portions toward the central portion of the neck portion of the screw.

In addition, in the present invention, it is possible to employ a structure of combination of a tamperproof screw and a screwdriver bit, wherein:

the tamperproof screw is comprised of: bit engaging grooves formed in the screw head of the screw, inclined portions that have a specified angle of inclination and are formed toward a central portion of a neck portion of the screw from open end edge portions of the bit engaging grooves, step portions that are respectively substantially perpendicular in cross section and are formed in intermediate point of the inclined portions, and a substantially conical bottom surface formed in the central portion where the inclined portions meet; and the tamperproof screw is characterized in that: an inverted truncated cone shape hole portion that reaches the bottom surface is formed as a continuation, except for the step portions, of the inclined portions so that the open end edge portions of the bit engaging grooves take a maximum diameter of the inverted truncated cone shape hole portion, and a projecting portion is formed so as to protrude from the central portion of the bottom surface to a position above the step portions of the bit engaging grooves; and the screwdriver bit is characterized in that the screwdriver bit is comprised of: vane portions having substantially perpendicular end edge portions that engage with the step portions formed in intermediate point of the inclined portions of the bit engaging grooves of the tamperproof screw, a protruding portion formed by extending the tip ends of the respective vane portions so as to conform to the shape of the inverted truncated cone shape hole portion and the inclined portions that extend from the step portions toward the central portion of the neck portion of the screw, and a hollow space formed in the center of the tip end of the protruding portion so that the projecting portion is guided thereinto.

In the above combination of the tamperproof screw and screwdriver bit, it is possible to employ a structure in which the protruding portion on the bit tip end of the screwdriver bit is formed with an angle of inclination of substantially 20 to 30° with respect to the axis of the screwdriver bit.

Furthermore, in the present invention, the above described tamperproof screw is manufactured by a header punch that is characterized in that the header punch is comprised of: projecting portions which have substantially perpendicular end edge portions and form perpendicular or recessed wall portions and step portions in the end edge portions of bit engaging grooves in the screw head of the tamperproof screw, and a conical projecting portion which forms an inverted truncated cone shape hole portion and inclined portions in the central portion of the bit engaging grooves and to form a substantially conical bottom surface in the inverted truncated cone shape hole portion.

Furthermore, in the present invention, the above described tamperproof screw can be manufactured by a header punch that is characterized in that the header punch is comprised of: projecting portions which have substantially perpendicular end edge portions and form perpendicular or recessed wall portions and step portions in the end edge portions of bit engaging grooves in the screw head of the tamperproof screw, a conical projecting portion which forms an inverted truncated cone shape hole portion and inclined portions in the central portion of the bit engaging grooves and to form a substantially conical bottom surface in the inverted truncated cone shape hole portion, and a cavity portion which is provided in the center of the tip end of the conical projecting portion and forms a projecting portion in the inverted truncated cone shape hole portion.

(Description of the Reference Symbols)

| | |
|---|---|
| 10A, 10A' Tamperproof screw (pan type) | |
| 10B, 10B' Tamperproof screw (dish type) | |
| 10C, 10C' Tamperproof screw (fan-shaped groove type) | |
| 10D, 10D' Tamperproof screw (three-way groove type) | |
| 10a Screw head | 10b Screw neck portion |
| 12 Bit engaging grooves (cruciform groove) | 12' Bit engaging grooves (three-way groove) |
| 12a Opening end edge portion | 12b Perpendicular or recessed wall portion |
| 12b' Lower edge portion of wall portion | 13 Bottom surface |
| 14 Step portion | 14a End edge portion of step portion |
| 14b Side wall portion of step portion | 14c Fan-shaped groove portion |
| 15 Inclined portions | 16 Inverted truncated cone shape hole portion |
| 18 Projecting portion | 20, 20' Screwdriver bit |
| 22 Vane portion | 22a End edge portion |
| 22b Side wall portion of vane portion | 24 Protruding portion |
| 26 Hollow space | 28 Plus type screwdriver |
| 28a Bit tip end | 29 Minus type screwdriver |
| 29a Bit tip end | 30, 30' Header punch |
| 34 Projecting portion | 34a End edge portion |
| 36 Conical projecting portion | 38 Cavity portion |

BEST MODE FOR CARRYING OUT THE INVENTION

Next, respective embodiments relating to the combinations of tamperproof screws and screwdriver bits according to the present invention, and the header punch of the present invention that is used to manufacture these tamperproof screws, will be described in detail below with reference to the accompanying drawings.

EMBODIMENT 1

Tamperproof Screw Structure Example 1a

Figure 1:
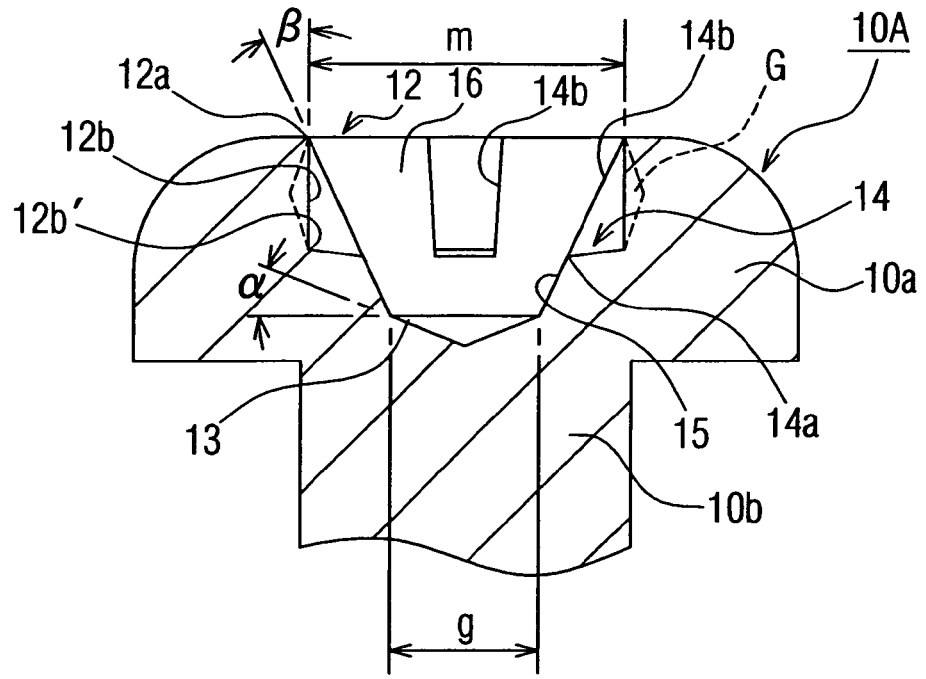
FIG. 1 is a sectional side view of the essential portion of a tamperproof screw that has a head constructed as a pan-shaped head according to one embodiment of the tamperproof screw of the present invention.
Figure 2:
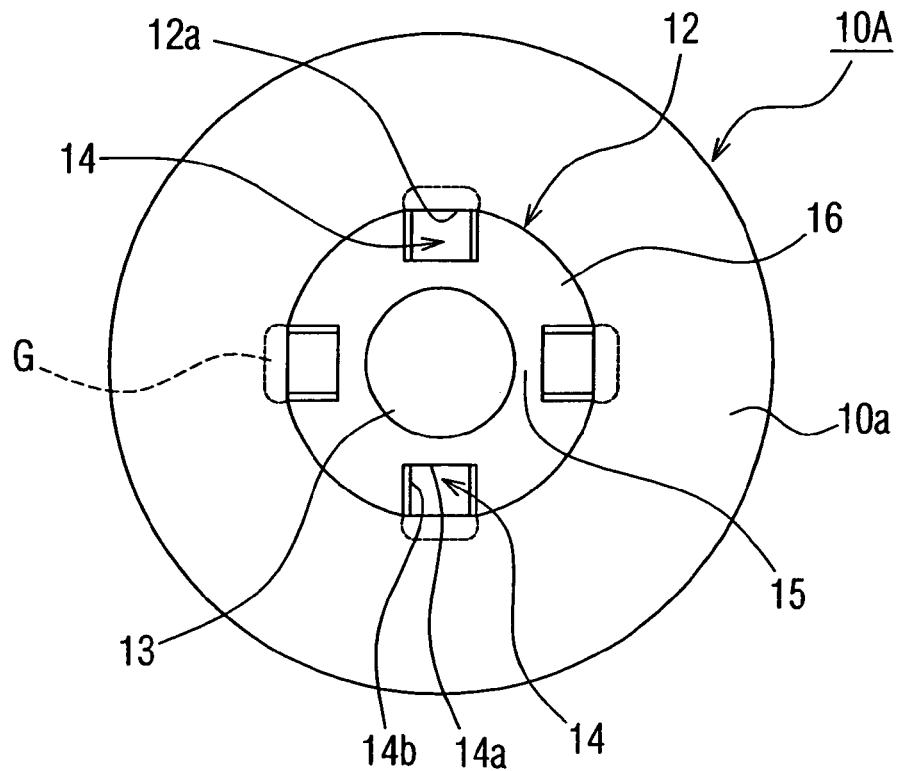
FIG. 2 is a top view of the head of the tamperproof screw of the present invention shown in FIG. 1.

FIGS. 1 and 2 show one embodiment of the tamperproof screw of the present invention. More specifically, in FIGS. 1 and 2, the reference symbol 10A indicates the tamperproof screw of the present invention. The head 10*a* of this tamperproof screw 10A is formed as a pan type head, and bit engaging grooves 12 are formed in the center of the head. The bit engaging grooves 12 are formed in the central portion of the screw head 10*a* as a cruciform groove in which perpendicular grooves intersect in the shape of a plus sign (+).

The bit engaging grooves 12 are formed by an opening portion dimension (m) and groove bottom portion dimension (g) based upon a conventionally known JIS (Japan Industrial Standard) (see FIG. 1). More specifically, this bit engaging grooves 12 have a structure in which inclined portions 15 that have an angle of inclination β of approximately 20 to 30° (e.g. 26°30') with respect to the axis of the screw are formed from the open end edge portions of the bit engaging grooves 12 to a predetermined depth, and a substantially conical bottom surface 13 which has a gradual angle of inclination a of approximately 15 to 35° with respect to the horizontal plane that is perpendicular to the axis of the screw is formed from the lower edge portion of the inclined portions 15 toward the central portion of the screw head 10*a*.

Furthermore, in the tamperproof screw of the present embodiment, as shown in FIG. 1, wall portions 12*b* that are substantially vertical (shown by solid lines) or that are recessed inward from the vertical plane in substantially a shallow V shape in cross section (shown by broken lines) are formed over a specified depth range in the open end edge portions 12*a* of the bit engaging grooves 12, and step portions 14 are formed so as to extend substantially horizontally from the lower edge portions 12*b*' of these wall portions 12*b*. Furthermore, the above-described inclined portions 15 are respectively formed from the end edge portions 14*a* of these step portions 14 toward the central portion of the neck portion 10*b* of the screw, and the substantially conical bottom surface 13 is formed in the bottom portion.

In the tamperproof screw 10A of the present embodiment, as shown in FIGS. 1 and 2, the screw is characterized by the fact that an inverted truncated cone shape hole portion 16 that reaches the bottom surface 13 is formed as a continuation, except for the step portions 14, of the inclined portions 15 so that the open end edge portions 12*a* of the bit engaging grooves 12 take the maximum diameter of the inverted truncated cone shape hole portion.

In the tamperproof screw 10A of the present embodiment, which is constructed as described above, substantially vertical side wall portions 14*b* of the step portions 14 which have an appropriate relief taper are respectively formed in the adjacent grooves of the bit engaging grooves 12 as shown in FIGS. 1 and 2. Accordingly, these side wall portions 14*b* of the step portions 14 contact and engage with the side wall portions 22b of the vane portions 22 of a screwdriver bit 20, which is described later, so that smooth screw tightening can be accomplished.

Accordingly, in the tamperproof screw 10A of the present embodiment, which is constructed as described above, since the step portions 14 and the wall portions 12b that are substantially vertical (shown by solid lines) or that are recessed (shown by broken lines) are formed in the end edge portions of the bit engaging grooves 12 of the screw head 10a, and since the inverted truncated cone shape hole portion 16 which reaches the bottom surface 13 is formed as a continuation, except for the step portions 14, of the inclined portions 15 from the open end edge portions 12a of the bit engaging grooves 12, a tamperproof effect can be effectively manifested so that in a case where a conventional plus type screwdriver is coupled with this screw, the screwdriver is caused to make idle rotation inside the inverted truncated cone shape hole portion 16, and coupling is prevented.

Tamperproof Screw Structure Example 1b

Figure 3:
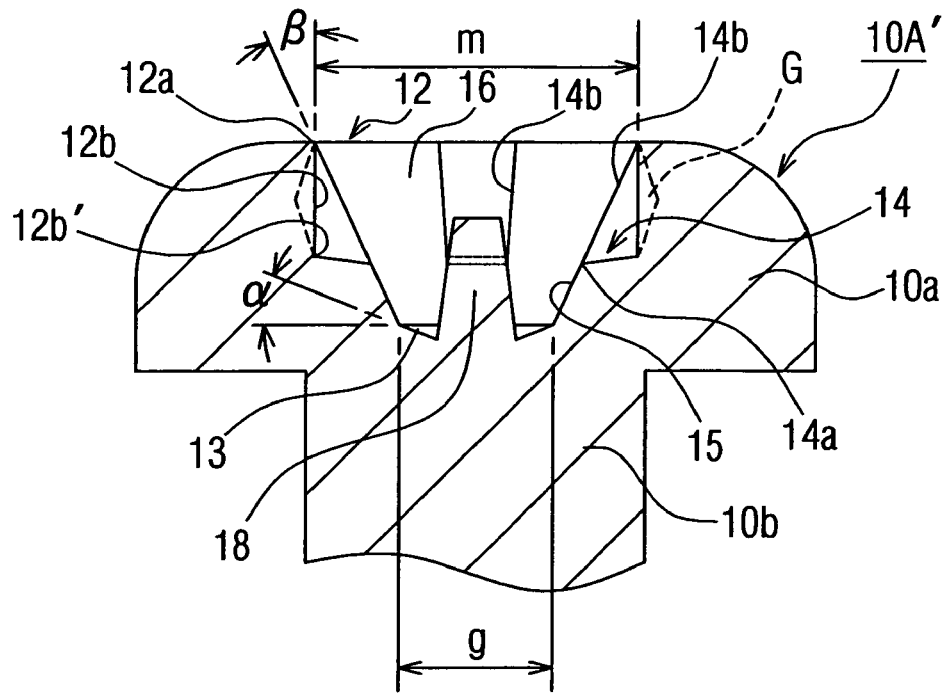
FIG. 3 is a sectional side view of the essential portion of a modification of the tamperproof screw of the present invention shown in FIG. 1.
Figure 4:
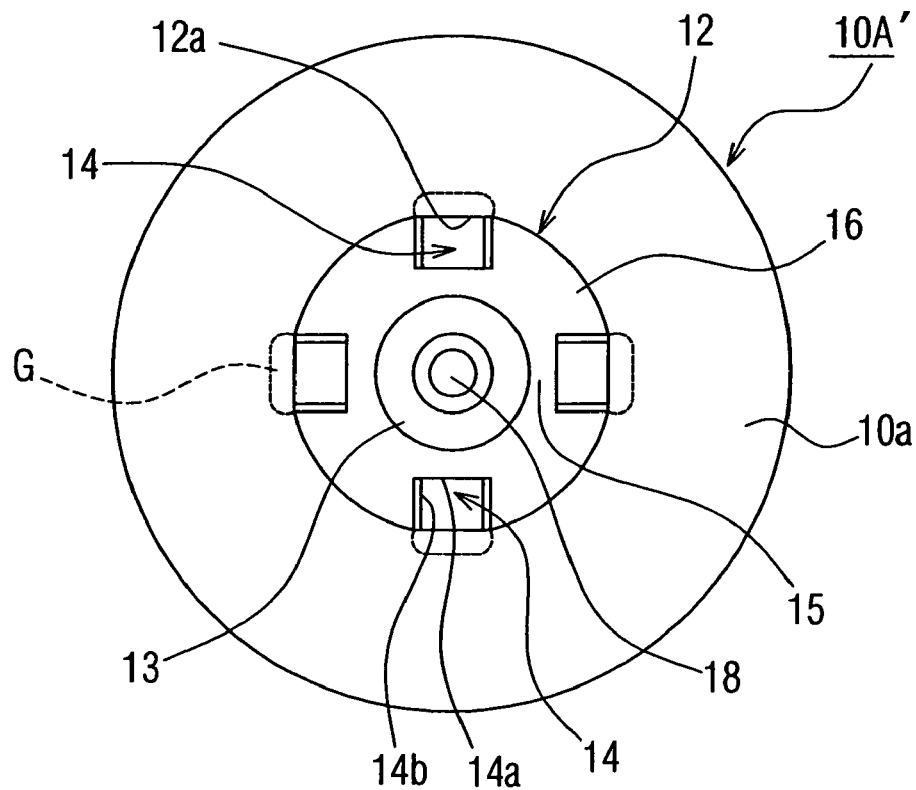
FIG. 4 is a top view of the head of the tamperproof screw of the present invention shown in FIG. 3.

Furthermore, in the tamperproof screw 10A of the present embodiment, a tamperproof screw 10A', as shown in FIGS. 3 and 4, can be formed so that it has a structure in which an inverted truncated cone shape hole portion 16 that reaches the bottom surface 13 is formed as a continuation, except for the step portions 14, of the inclined portions 15 from the open end edge portions 12a of the bit engaging grooves 12, and a projecting portion 18 is formed so as to protrude from the central portion of the bottom surface 13 to a position above the step portions 14 of the bit engaging grooves 12. The other structure is the same as in the tamperproof screw 10A of the embodiment shown in FIGS. 1 and 2; and therefore, the same constituent elements are labeled with the same symbols, and a detailed description of such elements is omitted.

In the tamperproof screw 10A' of the present embodiment, which is constructed as described above, since the projecting portion 18, which protrudes to a position above the step portions 14 of the bit engaging grooves 12 from the central portion of the bottom surface 13 of the inverted truncated cone shape hole portion 16, is formed, engagement with the step portions 14 is prevented in the case of coupling with a conventional minus type screwdriver, so that the screwdriver is caused to make idle rotation inside the inverted truncated cone shape hole portion 16, thus allowing a tamperproof effect to be effectively manifested in the same manner as described above.

EMBODIMENT 2

Tamperproof Screw Structure Example 2a

Figure 5:
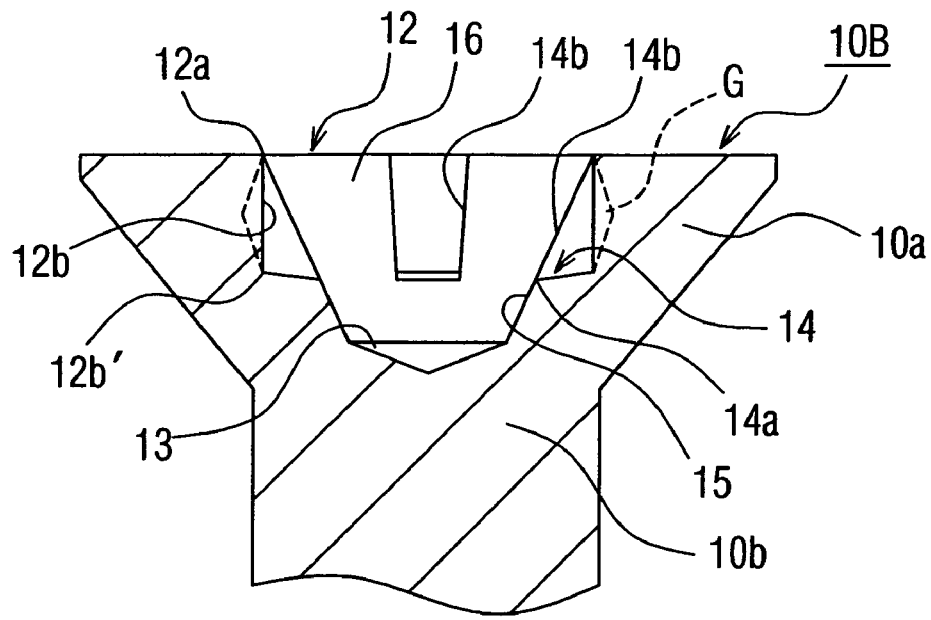
FIG. 5 is a sectional side view of the essential portion of a tamperproof screw that has a head constructed as a dish-shaped head according to another embodiment of the tamperproof screw of the present invention.

FIG. 5 shows another embodiment of the tamperproof screw of the present invention. More specifically, in FIG. 5, the tamperproof screw 10B of the present embodiment is a screw in which the screw head 10a is formed as a dish-shaped portion. The structure of the bit engaging grooves 12 formed in the screw head 10a of the tamperproof screw 10B of the present embodiment is the same as that of the bit engaging grooves 12 formed in the screw head 10a (which is formed as a pan-shaped portion) of the tamperproof screw 10A of the embodiment shown in FIGS. 1 and 2. Accordingly, the same constituent elements are labeled with the same reference symbols, and a detailed description of such elements is omitted. Exactly the same effects and merits as those of the tamperproof screw 10A of the above-described embodiment can also be manifested in the tamperproof screw 10B of the present embodiment.

Tamperproof Screw Structure Example 2b

Figure 6:
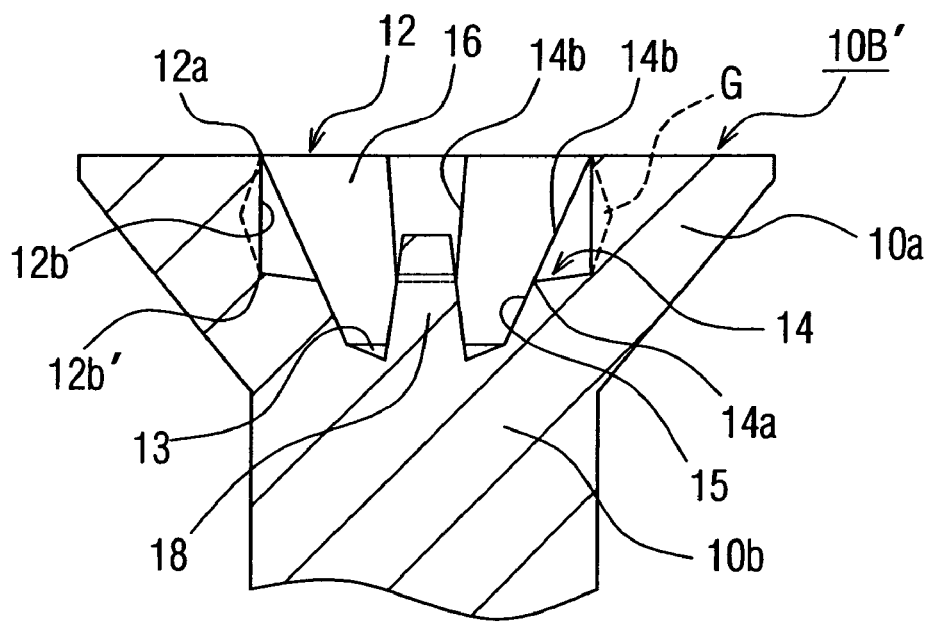
FIG. 6 is a sectional side view of the essential portion of a modification of the tamperproof screw of the present invention shown in FIG. 5.

FIG. 6 shows a tamperproof screw 10B' having a structure in which an inverted truncated cone shape hole portion 16 that reaches the bottom surface 13 of the bit engaging grooves 12 and a projecting portion 18 that protrudes from the central portion of the bottom surface 13 to a position above the step portions 14 of the bit engaging grooves 12 are formed in the tamperproof screw 10B shown in FIG. 5 in the same manner as in the structure of the above-described Embodiment 1 shown in FIGS. 3 and 4. The other structure is the same as in the tamperproof screw 10B of the embodiment shown in FIG. 5; and therefore, the same constituent elements are labeled with the same reference symbols, and a detailed description such elements is omitted. Exactly the same effects and merits as those of the tamperproof screw 10A' of the above-described embodiment can also be manifested in the tamperproof screw 10B' constructed in this manner.

EMBODIMENT 3

Tamperproof Screw Structure Example 3a

Figure 7:
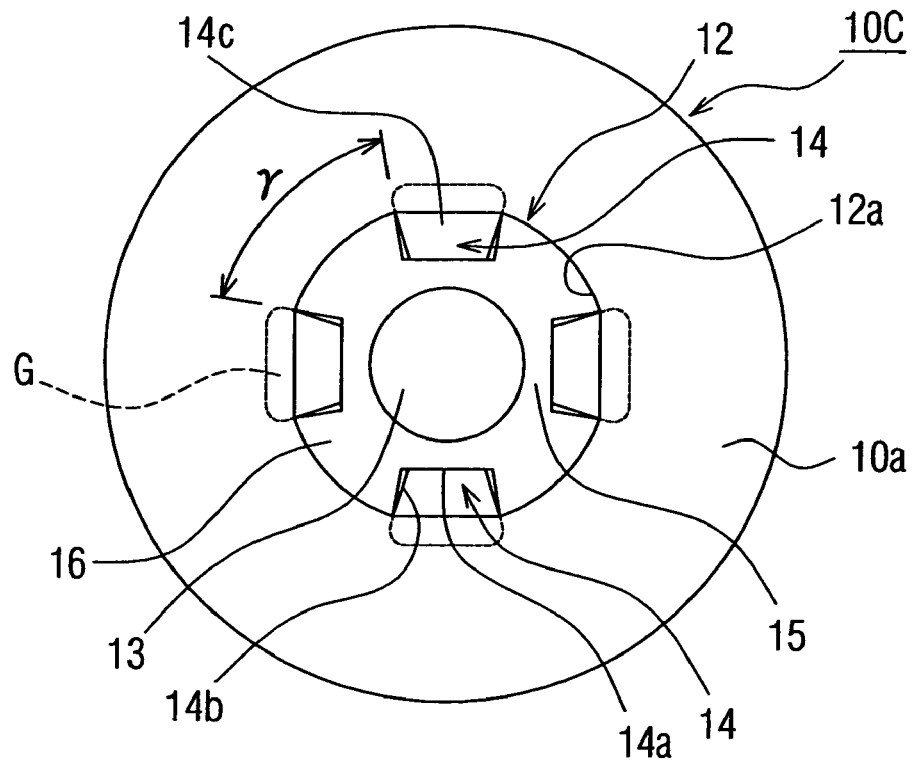
FIG. 7 is a top view of the head of a tamperproof screw, showing another embodiment of the bit engaging grooves of the tamperproof screw of the present invention.

FIG. 7 shows still another embodiment of the tamperproof screw of the present invention. FIG. 7 shows a modification of the bit engaging grooves 12 formed in the screw head 10a. For the convenience of description, constituent elements that are the same as those in the tamperproof screw 10A of the embodiment shown in FIGS. 1 and 2 are labeled with the same reference symbols, and a detailed description of such elements is omitted. More specifically, in FIG. 7, the tamperproof screw 10C of the present embodiment is a screw which is constructed so that the side wall portions 14b of the mutually facing step portions 14 of the bit engaging grooves 12 form groove portions 14c in which the groove width is substantially broadened in a fan shape that is oriented radially outward from the central portion of the screw head 10a. The other structure is basically the same as in the tamperproof screw 10A of the embodiment shown in FIGS. 1 and 2.

Accordingly, in the tamperproof screw 10C of the present embodiment, because of the fan-shaped groove portions 14c, the opening angle γ of the facing side wall portions 14b of the respective adjacent grooves is set at an acute angle that is slightly smaller than a right angle (90°), so that in the combination with a screwdriver bit 20, which is described later, "come-out" from the bit engaging grooves 12 of the tamperproof screw 10C can be effectively prevented in the same manner as in the above-described embodiment.

Tamperproof Screw Structure Example 3b

Figure 8:
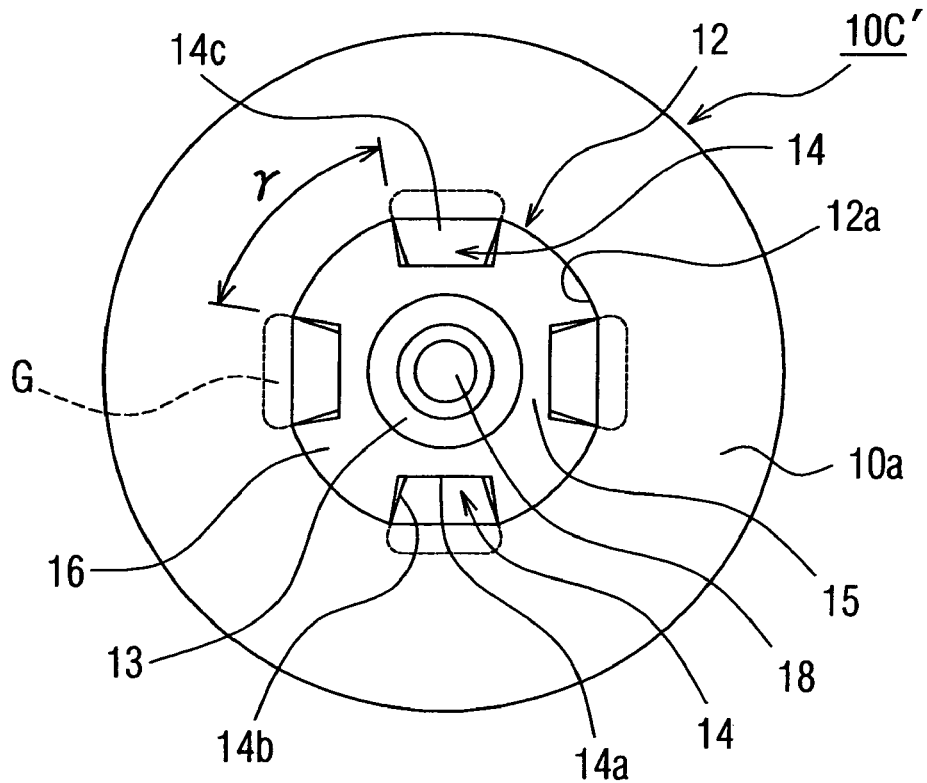
FIG. 8 is a top view of the head of a tamperproof screw, showing a modification of the tamperproof screw of the present invention shown in FIG. 7.

FIG. 8 shows a tamperproof screw 10C' that has a structure in which an inverted truncated cone shape hole portion 16 that reaches the bottom surface 13 of the bit engaging grooves 12 and a projecting portion 18 that protrudes from the central portion of the bottom surface 13 to a position above the step portions 14 of the bit engaging grooves 12 are formed in the tamperproof screw 10C shown in FIG. 7 in the same manner as in the structure of the above-described Embodiment 2 shown in FIG. 6. The other structure is the same as in the tamperproof screw 10C of the embodiment shown in FIG. 7; and therefore, the same constituent elements are labeled with the same reference symbols, and a detailed description such elements is omitted. Exactly the same effects and merits as those of the tamperproof screw 10A' of the above-described Embodiment 1 can also be manifested in the tamperproof screw 10C' constructed in this manner.

EMBODIMENT 4

Tamperproof Screw Structure Example 4a

Figure 9:
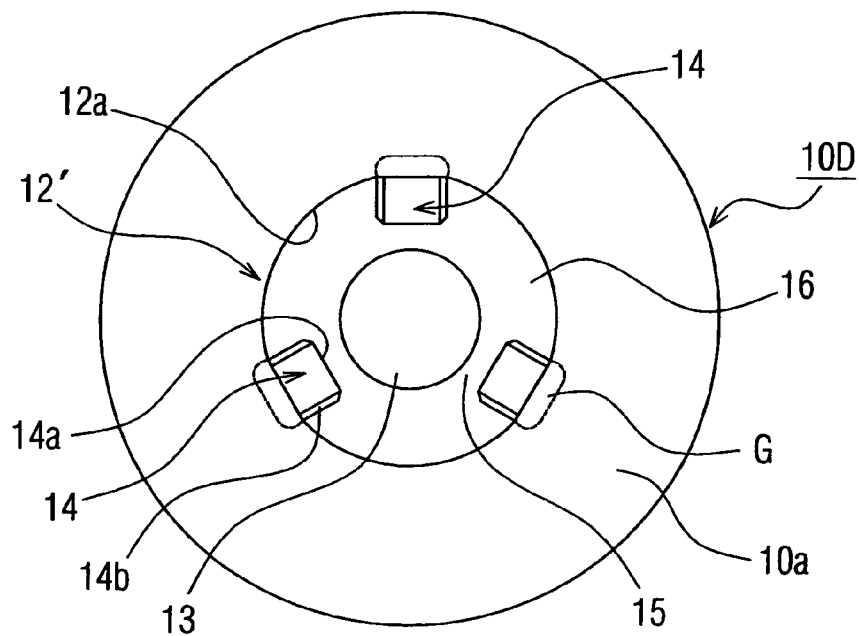
FIG. 9 is a top view of the head of a tamperproof screw, showing still another embodiment of the bit engaging grooves of the tamperproof screw of the present invention.

FIG. 9 shows still another modification of the bit engaging grooves 12 formed in the screw head 10a of the tamperproof screw of the present invention. For the convenience of description, constituent elements that are the same as those in the tamperproof screw 10A of the embodiment shown in FIGS. 1 and 2 are labeled with the same reference symbols, and a detailed description of such elements is omitted. More specifically, in FIG. 9, the tamperproof screw 10D of the present embodiment is a screw in which the bit engaging grooves 12' consisting of a three-way groove that branches in three directions from the central portion of the screw head 10a are constructed instead of the cruciform groove of the bit engaging grooves 12 in the tamperproof screw 10A of the embodiment shown in FIGS. 1 and 2.

In the structure of the bit engaging grooves 12' consisting of a three-way groove, the groove is basically the same as the bit engaging grooves 12 of the tamperproof screw 10A of the embodiment shown in FIGS. 1 and 2. Here, only the number of grooves is different, and the internal structure is exactly the same. Accordingly, in the case of the tamperproof screw 10D of the present embodiment constructed as described above, a deformation or modification of a conventional plus type or minus type screwdriver is difficult, and the advantage of a greatly increased tamperproof effect is obtained.

Tamperproof Screw Structure Example 4b

Figure 10:
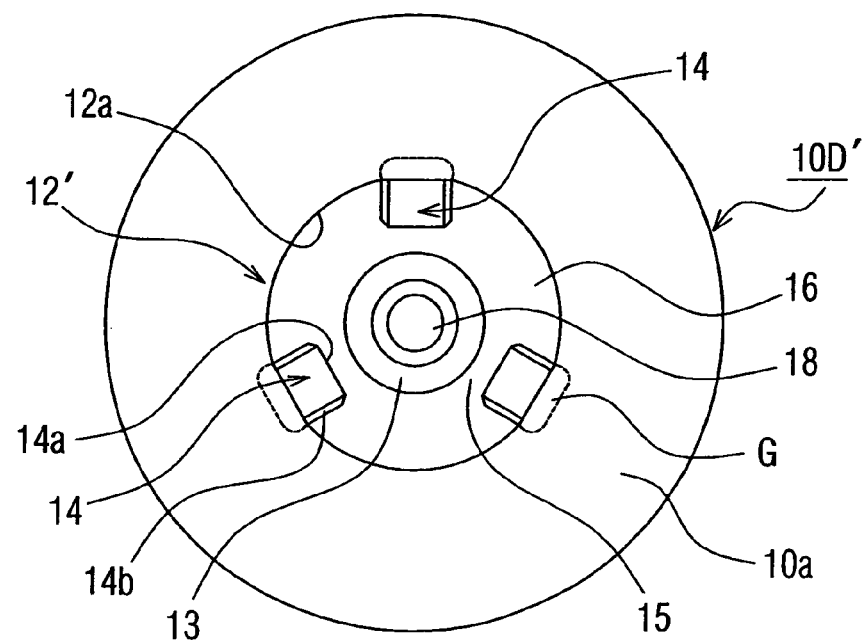
FIG. 10 is a top view of the head of a tamperproof screw, showing a modification of the tamperproof screw of the present invention shown in FIG. 9.

FIG. 10 shows a tamperproof screw 10D' that has a structure in which an inverted truncated cone shape hole portion 16 that reaches the bottom surface 13 of the bit engaging grooves 12 and a projecting portion 18 that protrudes from the central portion of the bottom surface 13 to a position above the step portions 14 of the bit engaging grooves 12 are formed in the tamperproof screw 10D shown in FIG. 9 in the same manner as in the structure of the above-described Embodiment 2 shown in FIG. 6. The other structure is the same as in the tamperproof screw 10D of the embodiment shown in FIG. 9; and therefore, the same constituent elements are labeled with the same reference symbols, and a detailed description such elements is omitted. Exactly the same effects and merits as those of the tamperproof screw 10A' of the above-described Embodiment 1 can be manifested in the tamperproof screw 10D' constructed in this manner.

Respective preferred embodiments of the tamperproof screw 10 of the present invention are described above. However, the bit engaging grooves 12 of the tamperproof screw 10 of the present invention are formed on the basis of the opening portion dimension (m) and groove bottom portion dimension (g) that are based upon the conventionally known JIS (Japan Industrial Standard); and coupling with a bit tip end of a conventional plus type screwdriver can be assuredly prevented, and a tamperproof effect can be sufficiently manifested by the step portions 14 that are formed substantially perpendicular in cross section in intermediate point of the bit engaging grooves 12 and by the inverted truncated cone shape hole portion 16 which are formed so as to reach the bottom surface 13 as a continuation, except for the step portions 14, of the inclined portions 15 so that the opening end edge portions 12a of the bit engaging grooves 12 takes the maximum diameter of the inverted truncated cone shape hole portion 16. Furthermore, coupling with a bit tip end not only of a conventional plus type screwdriver but also of a minus type screwdriver can be assuredly prevented, so that a tamperproof effect can be more effectively manifested by the inverted truncated cone shape hole portion 16 and by the projecting portion 18 that protrudes from the central portion of the bottom surface 13 to a position above the step portions 14 of the bit engaging grooves 12.

Furthermore, when a screwdriver bit 20 that has the structure described below is used for the tamperproof screw 10 of the present invention, the screwdriver bit 20 can be coupled with the side wall portions 14b of the step portions 14 that are respectively formed substantially at right angles in cross section in intermediate point of the bit engaging grooves 12 of the tamperproof screw 10; as a result, an area that is sufficient to apply the rotational driving force can be attained, "come-out" of the screwdriver bit 20 can be assuredly prevented, and torque transmission that is balanced with respect to the tamperproof screw 10 can be accomplished, so that proper screw tightening can be performed.

Moreover, since the bit engaging grooves 12 are formed in the tamperproof screws 10A, 10B whose screw heads 10a are respectively of a pan type head (see FIG. 2) and a dish type head (see FIG. 3), the setting of the angle of inclination β of the inclined portions 15 and the inverted truncated cone shape hole portion 16 makes it possible to maintain the thickness of the boundary portion between the screw head 10a and screw neck portion 10b at an appropriate value. Accordingly, an advantage that the strength of the screw during tightening can be sufficiently increased is obtained. Furthermore, the bit engaging grooves 12 having such a shape can be formed simply and easily by means of a header punch 30, which is described later.

EMBODIMENT 5

Screwdriver Bit Structure Example 1a

Figure 11:
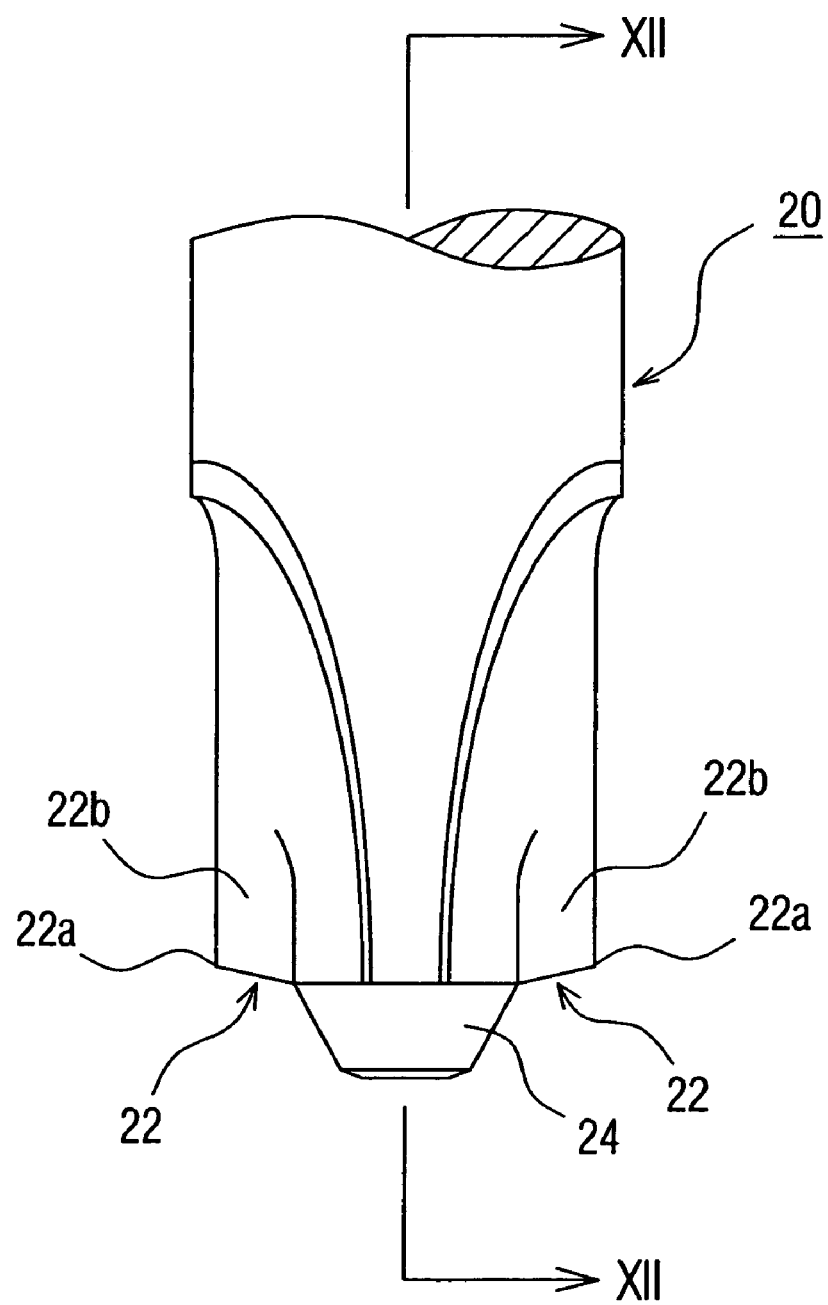
FIG. 11 is an enlarged side view of the essential portion of an embodiment of the screwdriver bit of the present invention, which is provided with a bit tip end that is compatible with tamperproof screw of the present invention shown in FIG. 1.
Figure 12:
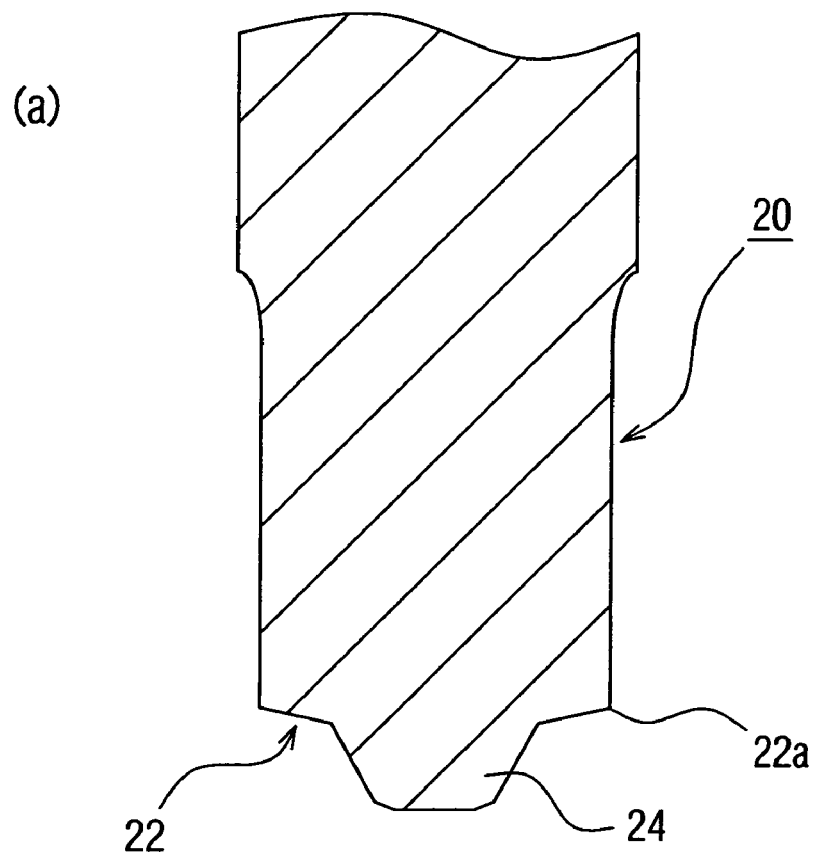
FIG. 12(a) is a sectional view of the essential portion of the screwdriver bit of the present invention shown along the line XII—XII in FIG. 11.
FIG. 12(b) is an end view of the bit tip end of the screwdriver bit of the present invention shown in FIG. 11.
Figure 12:
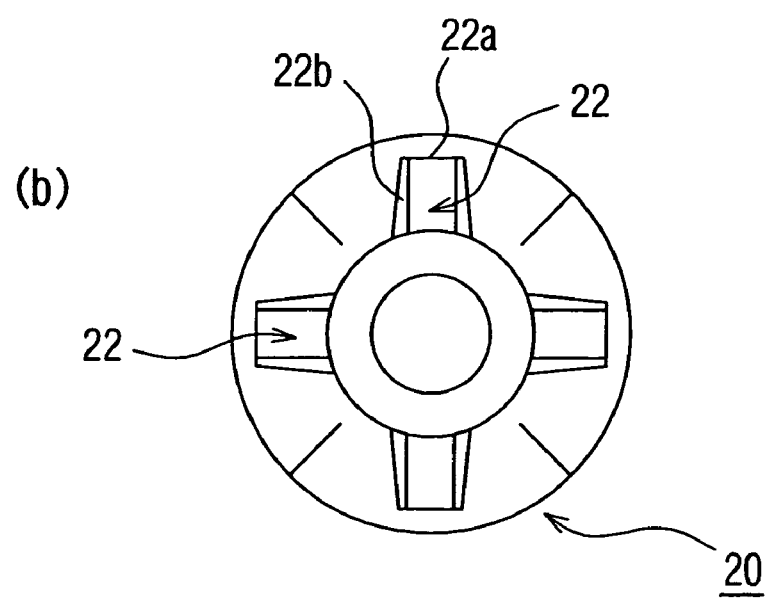

FIG. 11 and FIGS. 12(a) and 12(b) show an embodiment of a screwdriver bit 20 that is used for the tamperproof screws 10A, 10B of the present invention. The screwdriver bit 20 of the present embodiment engages with the bit engaging grooves 12 of the tamperproof screw 10A or 10B and has respective vane portions 22 that correspond to the substantially perpendicular (shown by solid lines) or recessed (shown by broken lines) wall portions 12b formed on the end edge portions of the bit engaging grooves 12 and that extend substantially at right angles so as to engage with the step portions 14. In addition, the screwdriver bit 20 of the present embodiment is provided with a protruding portion 24 which is formed by extending the tip ends of the respective vane portions 22 so that such tip ends conform to the shape of the inclined portions 15 and the inverted truncated cone shape hole portion 16 which extend toward the central portion of the screw neck portion 10b from the end edge portions 14a of the step portions 14 of the bit engaging grooves 12.

The screwdriver bit 20 of the present embodiment, which is constructed as described above, has, as shown in FIGS.

12(*a*) and 12(*b*), substantially vertical side wall portions 22*b* that are formed on both side surfaces of the respective vane portions 22 and protruding portion 24 and are in somewhat a tapered shape. The side wall portions 22*b* of these vane portions 22 contact and engage with the side wall portions 14*b* of the step portions 14 of the tamperproof screws 10A, 10B, so that smooth screw tightening can be accomplished and "come-out" can be easily and assuredly prevented.

Screwdriver Bit Structure Example 1b

Figure 13:
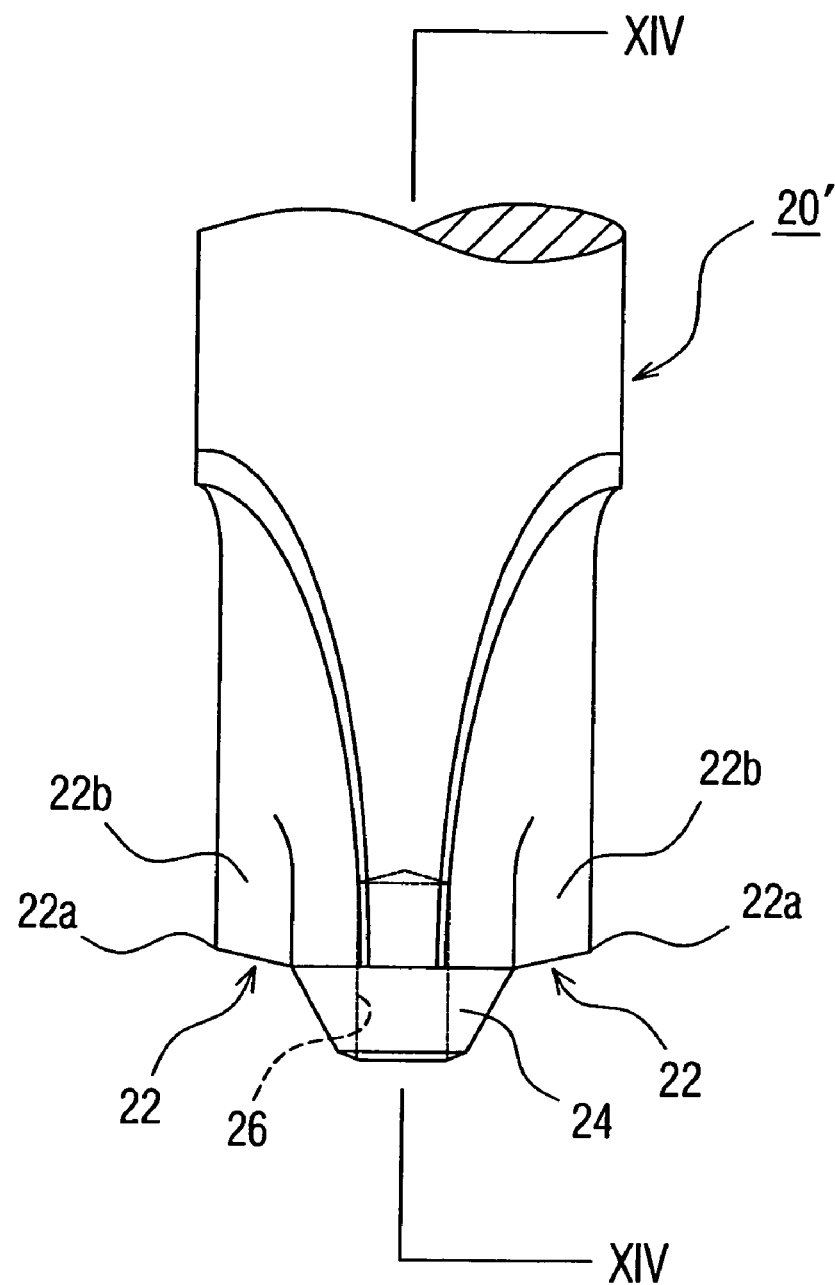
FIG. 13 is an enlarged side view of the essential portion of a modification of the screwdriver bit of the present invention, which is provided with a bit tip end that is compatible with the tamperproof screw of the present invention shown in FIG. 3.
Figure 14:
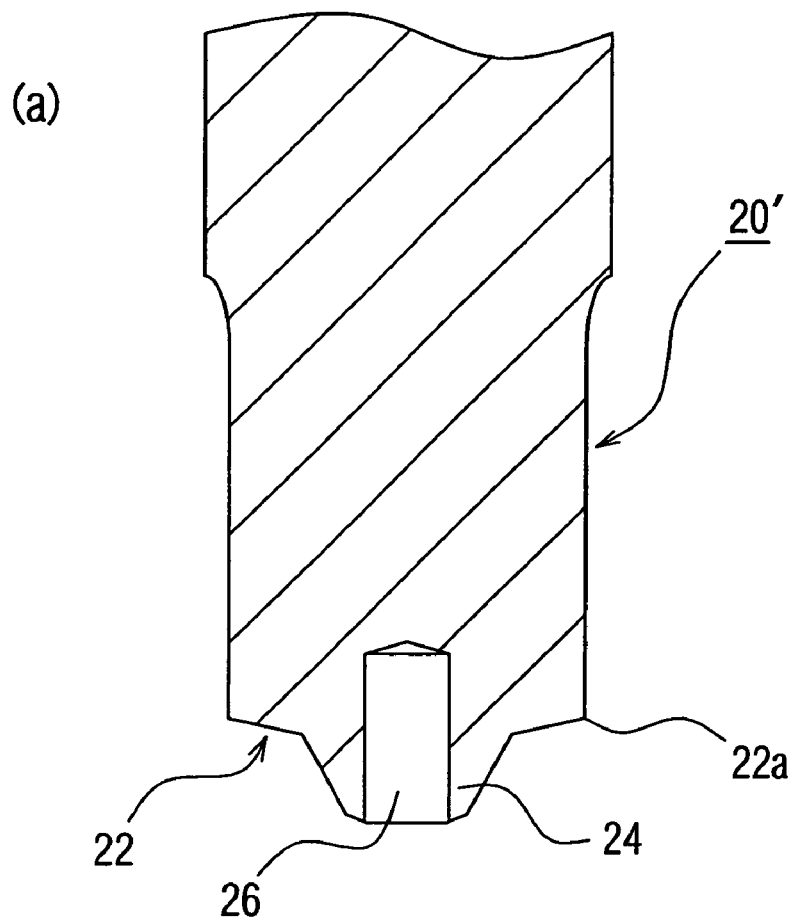
FIG. 14(a) is a sectional view of the essential portion of the screwdriver bit of the present invention shown along the line XIV—XIV in FIG. 13.
FIG. 14(b) is an end view of the bit tip end of the screwdriver bit of the present invention shown in FIG. 13.
Figure 14:
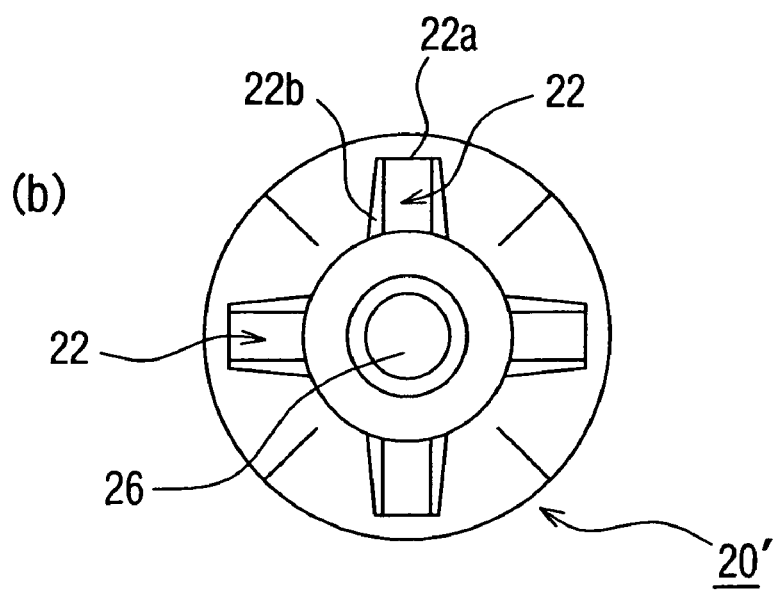

FIG. 13 and FIGS. 14(*a*) and 14(*b*) show a modification of the screwdriver bit 20' that is used for the tamperproof screws 10A', 10B' of the present invention. More specifically, in the present embodiment, the screwdriver bit is characterized by the fact that a hollow space 26 into which the projecting portion 18 formed in the bit engaging grooves 12 can be guided is formed in the center of the tip end of the protruding portion 24. The other structure is the same as in the structure of the screwdriver bit 20 shown in FIG. 11 and FIGS. 12(*a*) and 12(*b*); and therefore, the same constituent elements are labeled with the same reference symbols, and a detailed description of such elements is omitted.

Figure 15:
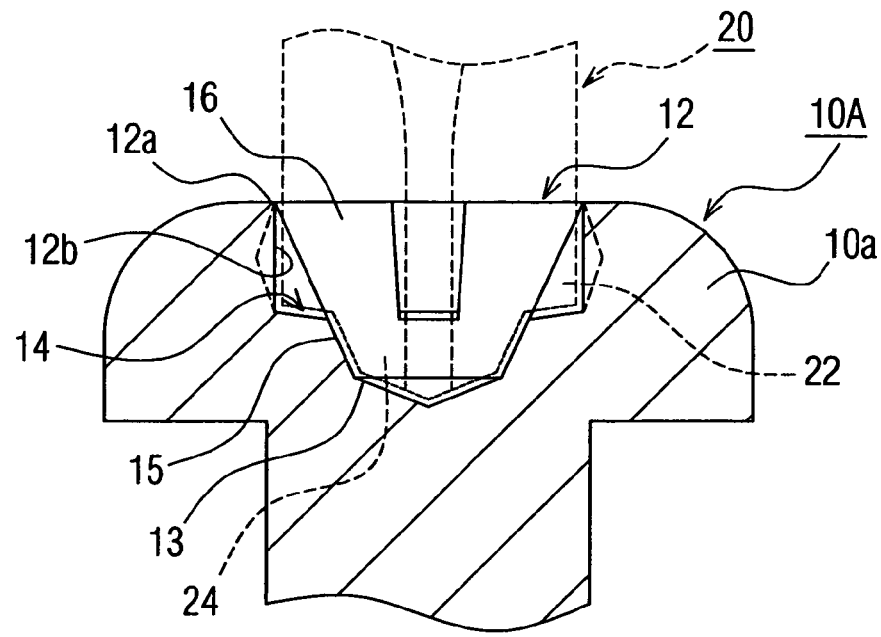
FIG. 15 is a sectional side view of the essential portion of the coupled state of the screwdriver bit of the present invention shown in FIG. 11 and the tamperproof screw of the present invention shown in FIG. 1.

A. Example 1 of Coupling of the Tamperproof Screw of the Present Invention and the Screwdriver Bit of the Present Embodiment FIG. 15 is a sectional side view of the essential portion of the coupled state of the tamperproof screw 10A (10B) of the present invention and the screwdriver bit 20 of the present embodiment (see FIG. 11 and FIGS. 12(*a*) and 12(*b*)). More specifically, as is clear from FIG. 15, the end edge portions 22*a* formed on the vane portions 22 and the protruding portion 24 of the screwdriver bit 20 respectively engage with or fitted in the step portions 14 formed in the bit engaging grooves 12 of the tamperproof screw 10A (10B). Furthermore, the side wall portions 22*b* of the vane portions 22 of the screwdriver bit 20 contact the side wall portions 14*b* of the step portions 14 of the tamperproof screw 10A (10B), so that a specified torque is transmitted to the tamperproof screw 10 when the screwdriver bit 20 is turned, thus making it possible to accomplish appropriate screw tightening.

Figure 16:
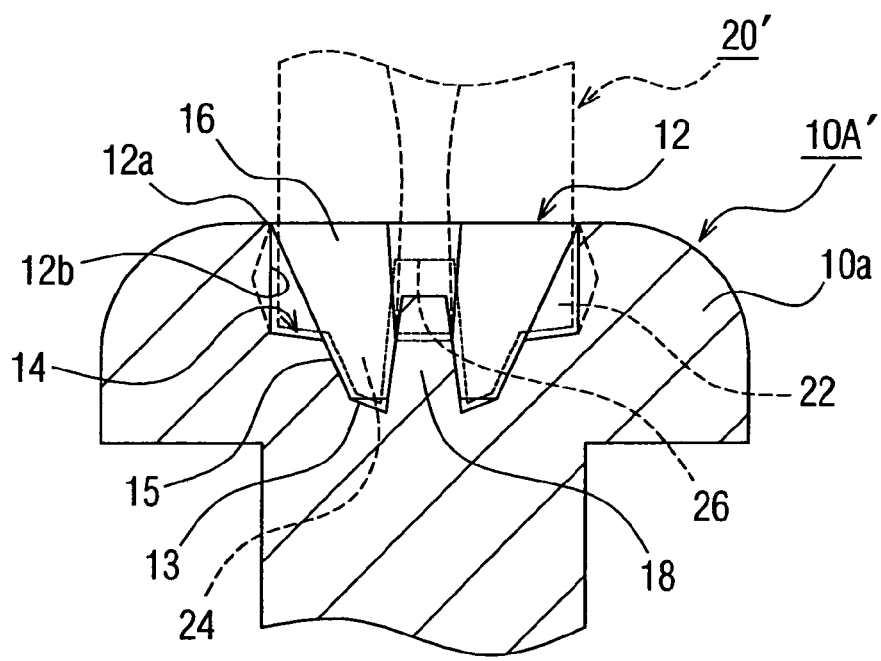
FIG. 16 is a sectional side view of the essential portion of the coupled state of the screwdriver bit of the present invention shown in FIG. 13 and the tamperproof screw of the present invention shown in FIG. 3.

B. Example 2 of Coupling of the Tamperproof Screw of the Present Invention and the Screwdriver Bit of the Present Embodiment FIG. 16 is a sectional side view of the essential portion of the coupled state of the tamperproof screw 10A' (10B') of the present invention and the screwdriver bit 20' of the present embodiment (see FIG. 13 and FIGS. 14(*a*) and 14(*b*)). More specifically, as is clear from FIG. 16, the end edge portions 22*a* formed on the vane portions 22 of the screwdriver bit 20' and the hollow space 26 formed in the center of the tip end of the protruding portion 24 respectively engage with the step portions 14 and projecting portion 18 formed in the bit engaging grooves 12 of the tamperproof screw 10A' (10B'). Furthermore, the side wall portions 22*b* of the vane portions 22 of the screwdriver bit 20' contact the side wall portions 14*b* of the step portions of the tamperproof screw 10A' (10B'), so that a specified torque is transmitted to the tamperproof screw 10A' (10B') when the screwdriver bit 20' is turned, thus making it possible to accomplish appropriate screw tightening.

In the combinations of the tamperproof screws 10A, 10B of the above-described Embodiments 1 and 2 with the screwdriver bit 20 (see FIG. 15), and in the combination of the tamperproof screws 10A', 10B' with the screwdriver bit 20' (see FIG. 16), in cases where the wall portions 12*b* of the end edge portions of the bit engaging grooves 12 of the tamperproof screws 10A, 10B and 10A', 10B' are formed in a recessed fashion (shown by broken lines), since portions that are recessed from the vertical plane are always present as gaps G, dirt, foreign objects or the like can be pushed into the bit engaging grooves 12 when the screws are coupled with the screwdriver bits 20 and 20'. As a result, an advantage that the engagement or fit-in between the bit tip ends of the screwdriver bits 20 and 20' and the tamperproof screws 10A, 10B and 10A', 10B' can always be accomplished easily and assuredly (see FIGS. 1 through 10) is obtained Furthermore, in regard to the screwdriver bits 20 and 20' that are respectively used for the tamperproof screws 10C, 10C' and 10D, 10D' of the above-described Embodiments 3 and 4, appropriate coupling or engagement with the screwdriver bits 20 and 20' can be accomplished by appropriately altering the design of the respective vane portions 22 and protruding portion 24 so that these elements respectively conform to the shapes of the bit engaging grooves 12 of the tamperproof screws 10C, 10C' and 10D, 10D'.

C. Example 1 of Coupling with a Conventional Plus Type Screwdriver

Figure 17:
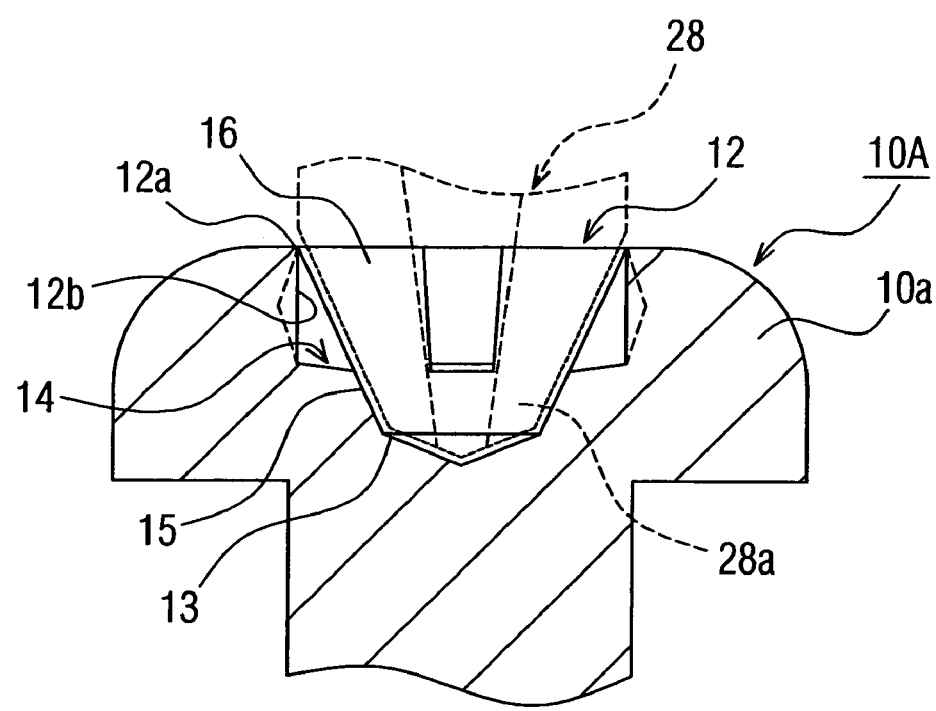
FIG. 17 is a sectional side view of the essential portion of the coupling of a conventional plus type screwdriver bit and the tamperproof screw of the present invention shown in FIG. 1.

FIG. 17 is a sectional side view of the essential portion of the coupling of the tamperproof screw 10A (10B) of the present invention with a conventional plus type screwdriver 28. More specifically, as is clear from FIG. 17, the bit tip end 28*a* of a plus type screwdriver 28 is merely loosely inserted into the inverted truncated cone shape hole portion 16 that is formed in the bit engaging grooves 12 of the tamperproof screw 10A (10B); as a result, coupling is prevented, and a tamperproof effect is manifested.

D. Example 2 of Coupling with a Conventional Plus Type Screwdriver

Figure 18:
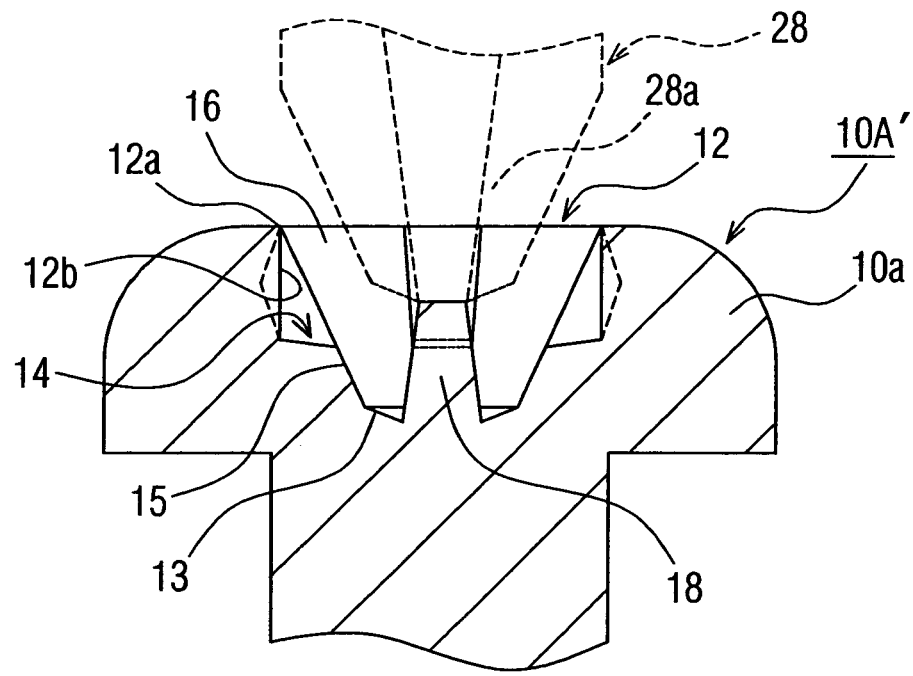
FIG. 18 is a sectional side view of the essential portion of the coupling of a conventional plus type screwdriver bit and the tamperproof screw of the present invention shown in FIG. 3.

FIG. 18 is a sectional side view of the essential portion of the coupling of the tamperproof screw 10A' (10B') of the present invention with a conventional plus type screwdriver 28. More specifically, as is clear from FIG. 18, the bit tip end 28*a* of a plus type screwdriver 28 is loosely inserted into the inverted truncated cone shape hole portion 16 that is formed in the bit engaging grooves 12 of the tamperproof screw 10A' (10B'), and this bit tip end abuts against the projecting portion 18; as a result, coupling is prevented, and a tamperproof effect is manifested. In this case, even if a hollow space into which the projecting portion 18 of the tamperproof screw 10A' (10B') can be guided is formed in the bit tip end 28*a* of the plus type screwdriver 28, since the engagement of the plus type screwdriver 28 with the step portions 14 formed in the bit engaging grooves 12 is impossible, the tamperproof effect is maintained.

E. Example 3 of Coupling with a Conventional Minus Type Screwdriver

Figure 19:
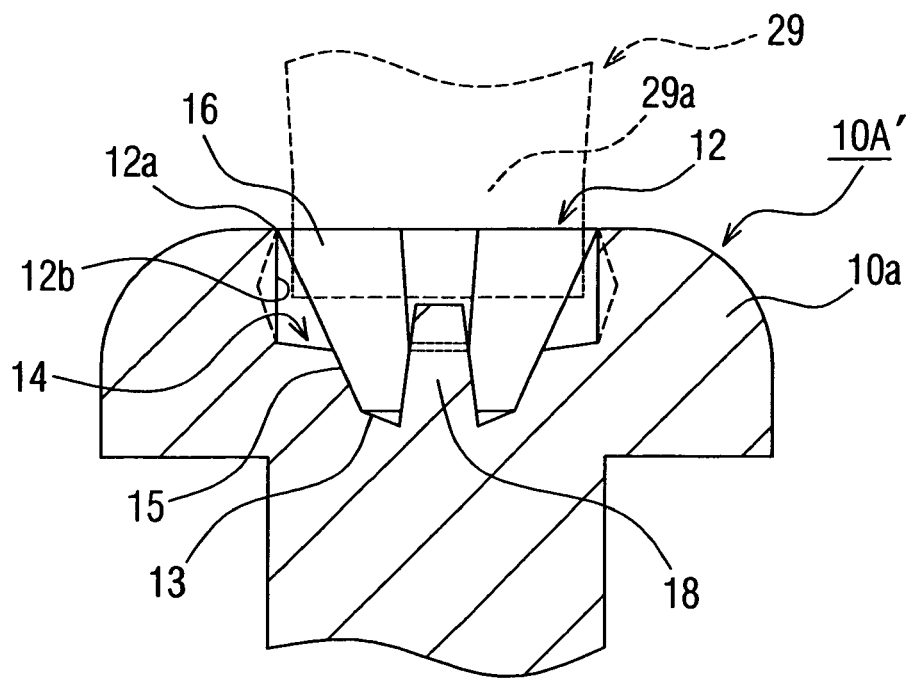
FIG. 19 is a sectional side view of the essential portion of the coupling of a conventional minus type screwdriver bit and the tamperproof screw of the present invention shown in FIG. 3.

FIG. 19 is a sectional side view of the essential portion of the coupling of the tamperproof screw 10A' (10B') of the present invention with a conventional minus type screwdriver 29. More specifically, as is clear from FIG. 19, in cases where an attempt is made to cause the engagement of the bit tip end 29*a* of the minus type screwdriver 29 with the step portions 14 formed in the bit engaging grooves 12 of the tamperproof screw 10A' (10B'), this bit tip end abuts against the projecting portion 18; as a result, an engagement of the minus type screwdriver 29 is prevented, and a tamperproof effect is manifested. In this case, furthermore, for the minus type screwdriver 29, even if a cut-out portion into which the projecting portion 18 of the tamperproof screw 10A' (10B') can be guided is formed in the bit tip end 29a, thus allowing engagement with the step portions 14 formed in the bit engaging grooves 12, the strength of the bit tip end 29a is lost so that the bit tip end 29a breaks when the screwdriver is turned; consequently, an engagement with the tamperproof screw 10A' (10B') is prevented, and the tamperproof effect can be maintained.

EMBODIMENT 6

Example 1a of Structure of Header Punch Used to Manufacture Tamperproof Screw

Figure 20:
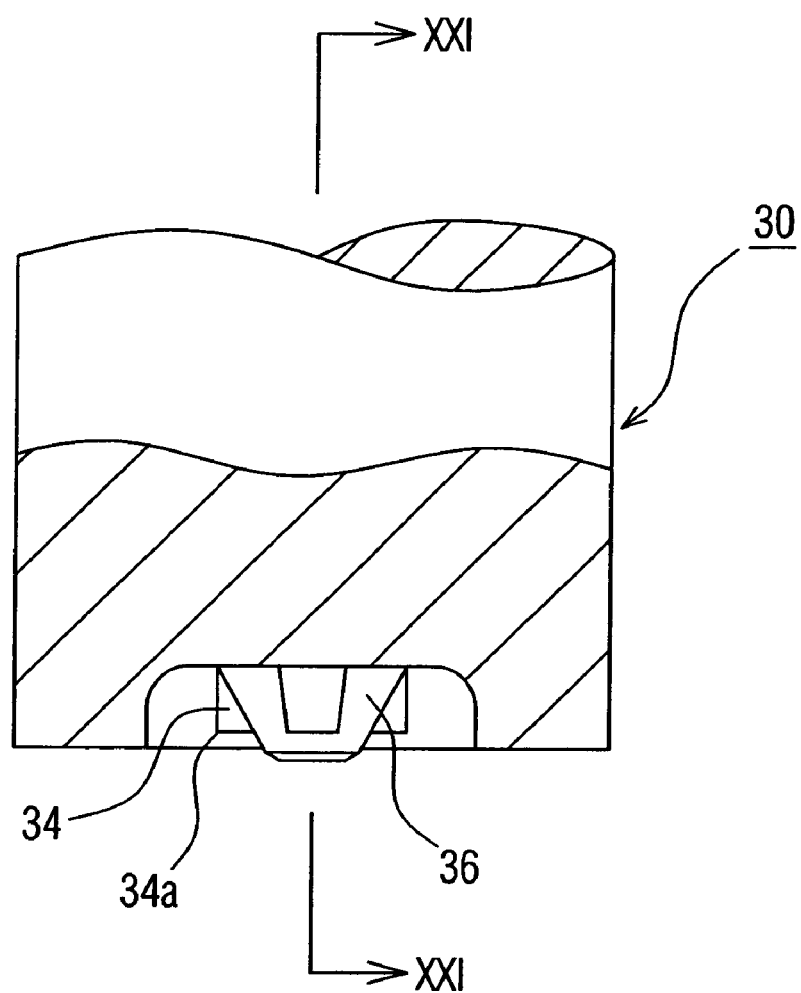
FIG. 20 is a side view of the essential portion of the header punch of the present invention used to manufacture a tamperproof screw, which is used to form the heads and bit engaging grooves of the tamperproof screw of the present invention shown in FIG. 1.
Figure 21:
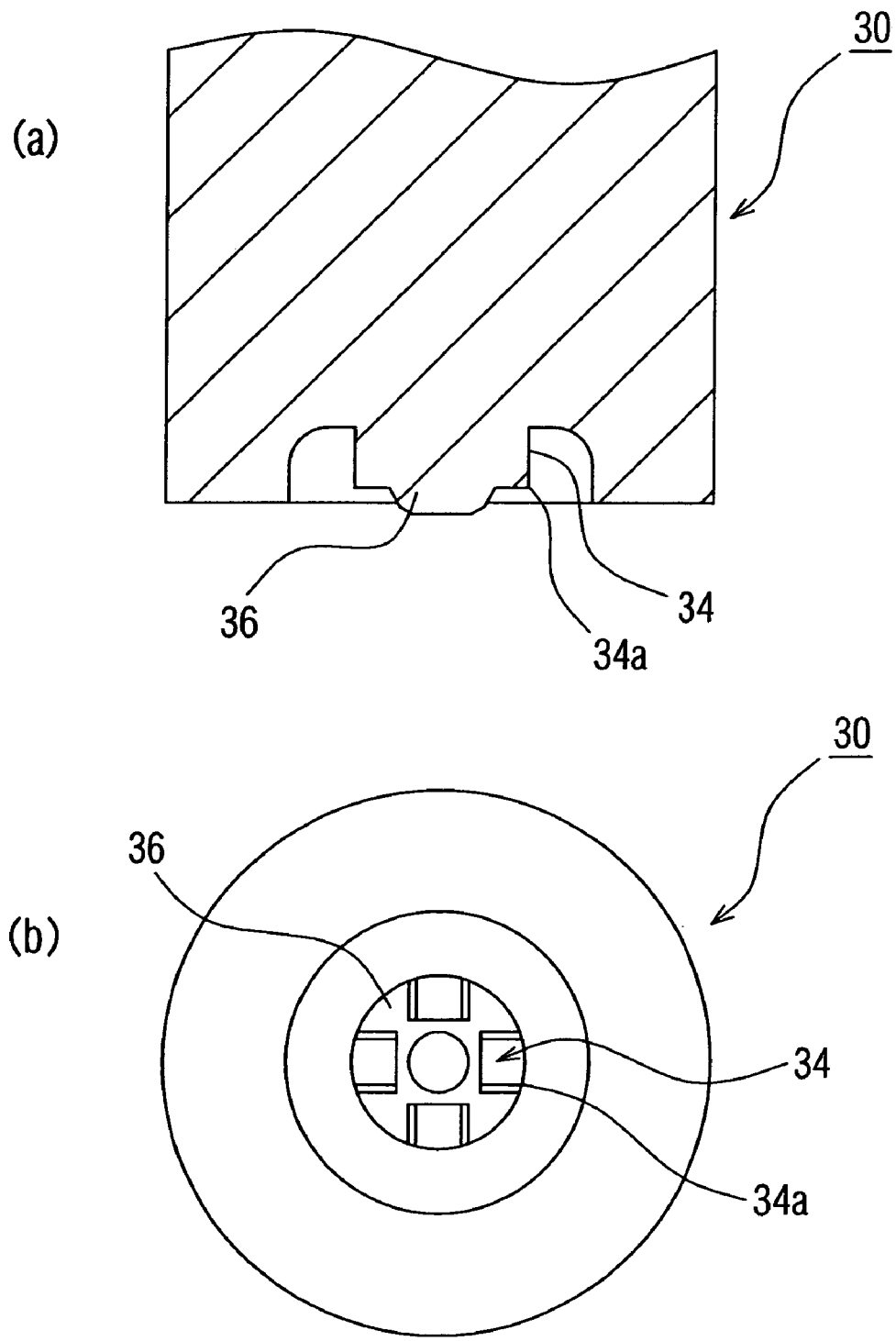
FIG. 21(*a*) is a sectional view of the essential portion of the header punch of the present invention shown along the line XXI—XXI in FIG. 20, FIG. 21(*b*) is an end view of the tip end side of the header punch of the present invention shown in FIG. 20.

FIG. 20 and FIGS. 21(a) and 21(b) show an embodiment of the header punch 30 that is used to manufacture the tamperproof screw 10A of Embodiment 1 shown in FIGS. 1 and 2. The header punch 30 of the present embodiment performs punch-out molding of the screw head 10a and bit engaging grooves 12 of the tamperproof screw 10A shown in FIG. 1. The header punch 30 of the present embodiment is comprised of projecting portions 34 and a conical projecting portion 36. Respective projecting portions 34 have substantially perpendicular end edge portions 34a that are used to form the perpendicular or recessed wall portions 12b and step portions 14 in the end edge portions of the bit engaging grooves 12 of the screw head 10a of the tamperproof screw 10A, and the conical projecting portion 36 is used to form the inclined portions 15 and inverted truncated cone shape hole portion 16 in the central portion of the bit engaging grooves 12 and to form the substantially conical bottom surface 13 of the inverted truncated cone shape hole portion 16.

Accordingly, in cases where the bit engaging grooves 12 in the screw head 10a of the tamperproof screw 10A are punched out using the header punch 30 of the present invention constructed as described above, the projecting portions 34 of the header punch 30 are punched against a screw head forming portion of a metal wire material, which forms the tamperproof screw 10, by causing a portion of the metal wire material used to form the bit engaging grooves 12 to be displaced by compression or elongation by the impact of the header punch 34; as a result, perpendicular or recessed wall portions 12b and step portions 14 such as those described above can be formed easily simultaneously in the end edge portions of the bit engaging grooves 12.

Example 1b of Structure of Header Punch Used to Manufacture Tamperproof Screw

Figure 22:
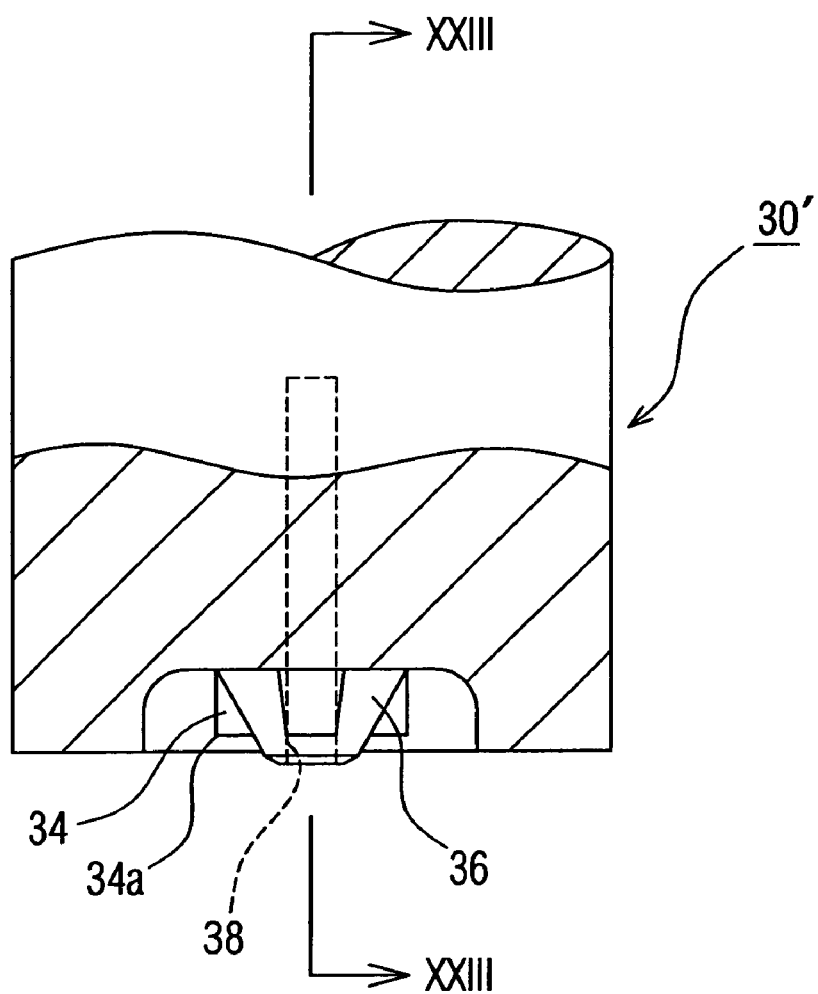
FIG. 22 is a side view of the essential portion of the header punch of the present invention used to manufacture a tamperproof screw, which is used to form the heads and bit engaging grooves of the tamperproof screw of the present invention shown in FIG. 3.
Figure 23:
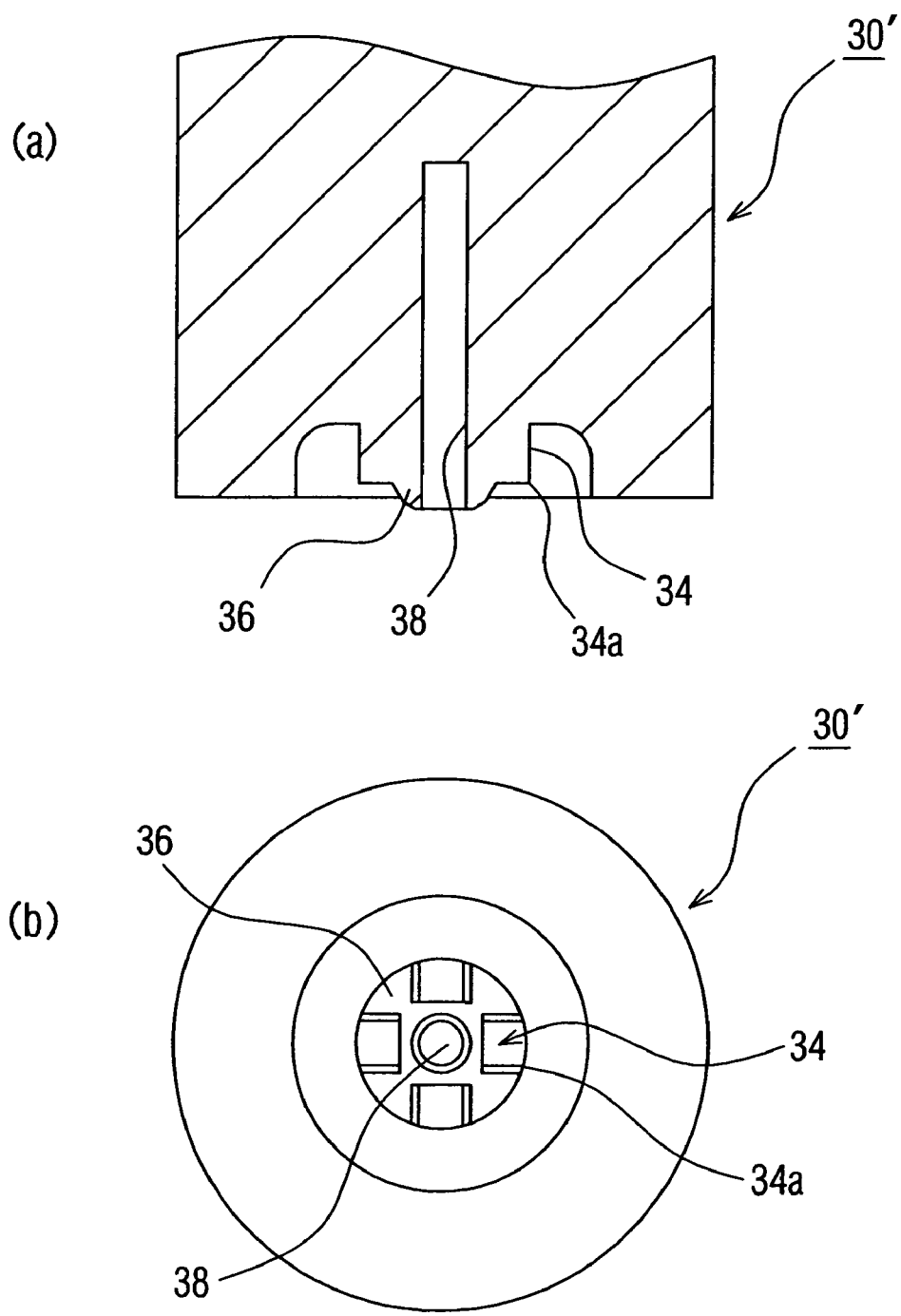
FIG. 23(*a*) is a sectional view of the essential portion of the header punch of the present invention shown along the line XXIII—XXIII in FIG. 22, FIG. 23(*b*) is an end view of the tip end side of the header punch of the present invention shown in FIG. 22.

FIG. 22 and FIGS. 23(a) and 23(b) show a modification of the header punch 30' that is used to manufacture the tamperproof screw 10A' of Embodiment 1 shown in FIGS. 3 and 4. In the present embodiment, the header punch is characterized by the fact that a cavity portion 38 that is used to form the projecting portion 18 of the bit engaging grooves 12 is formed in the center of the tip end of the conical projecting portion 36. The other structure is the same as in the structure of the header punch 30 shown in FIG. 20 and FIGS. 21(a) and 21(b); and therefore, the same constituent elements are indicated by the same reference labels, and a detailed description of such elements is omitted.

In regard to the header punches 30 and 30' that are respectively used to manufacture the tamperproof screws 10B, 10B', 10C, 10C' and 10D, 10D' of the embodiments described above, the manufacture of the respective tamperproof screws can easily be accomplished by appropriately altering the design of the respective projecting portions 34 so that these projecting portions respectively conform to the shapes of the bit engaging grooves 12 of the tamperproof screws 10B, 10B', 10C, 10C' and 10D, 10D'.

MERITS OF INVENTION

Preferred embodiments of the tamperproof screw of the present invention are respectively described above. In the tamperproof screw of the present invention, a tamperproof screw that assuredly prevents screw tightening can easily be obtained by improving the shape of the bit engaging grooves, based upon the structure of a conventional ordinary screw, so that coupling with a conventional ordinary screwdriver is prevented by means of a simple structure. Accordingly, the tamperproof screw of the present invention can be manufactured easily and at a low cost using a header punch that has a relatively simple structure.

Furthermore, a screwdriver bit that is used for the tamperproof screw of the present invention can accomplish coupling with the tamperproof screw quickly and easily as a result of the improved shape of the bit tip end based upon the structure of a conventional screwdriver bit, and "come-out" during screw tightening work can be assuredly prevented.

The invention claimed is:

1. A tamperproof screw comprising:
   a screw head of said screw,
   inclined portions that have a specified angle of inclination and are formed toward a central portion of a neck portion of said screw from open end edge portions of bit engaging grooves,
   step portions that are respectively substantially perpendicular in cross section and are formed in intermediate point of said inclined portions, said step portions forming said bit engaging grooves in said screw, and
   a substantially conical bottom surface formed in the central portion where said inclined portions meet; said tamperproof screw being characterized in that:
   an inverted truncated cone shape hole portion that reaches said bottom surface is formed as a continuation, except for said step portions, of said inclined portions so that said open end edge portions of said bit engaging grooves take a maximum diameter of said inverted truncated cone shape hole portion, and
   a projecting portion is formed so as to protrude from a central portion of said bottom surface to a position above said step portions of said bit engaging grooves and below a top surface of said screw head.

2. The tamperproof screw according to claim 1, characterized in that said inverted truncated cone shape hole portion and said inclined portions that reach said bottom surface from said open end edge portions of said bit engaging grooves have an angle of inclination of substantially 20 to 30 degrees with respect to an axis of said screw.

3. The tamperproof screw according to claim 1, characterized in that said step portions that are formed in intermediate point of said inclined portions are respectively formed with wall portions that are recessed inward from a vertical plane over a predetermined depth.

4. The tamperproof screw according to claim 3, characterized in that said wall portions that are formed in said step portions of said bit engaging grooves have a structure in which said wall portions are recessed in a shape of a substantially shallow V in cross section.

5. The tamperproof screw according to claim 1, characterized in that said screw head is constructed so that said screw head has a pan shape or a dish shape.

6. A combination comprising:
a tamperproof screw which is comprised of:
   a screw head of said screw,
   inclined portions that have a specified angle of inclination and are formed toward a central portion of a neck portion of said screw from, an open end edge portions of bit engaging grooves,
   step portions that are respectively substantially perpendicular in cross section and are formed in intermediate point of said inclined portions, said step portions forming said bit engaging grooves in said screw, and
   a substantially conical bottom surface formed in the central portion where said inclined portions meet;
   wherein said tamperproof screw is characterized in that:
   an inverted truncated cone shape hole portion that reaches said bottom surface is formed as a continuation, except for said step portions, of said inclined portions so that said open end edge portions of said bit engaging grooves take a maximum diameter of said inverted truncated cone shape hole portion; and
a screwdriver bit characterized in that said screwdriver bit is comprised of:
   vane portions having substantially perpendicular end edge portions that engage with said step portions formed in intermediate point of said inclined portions of said bit engaging grooves of said tamperproof screw, and
   a protruding portion formed by extending tip ends of said respective vane portions so as to conform to a shape of said inverted truncated cone shape hole portion and said inclined portions that extend from said step portions toward said central portion of said neck portion of said screw.

7. A combination comprising:
a tamperproof screw that is comprised of:
   a screw head of said screw,
   inclined portions that have a specified angle of inclination and are formed toward a central portion of a neck portion of said screw from open end edge portions of bit engaging grooves,
   step portions that are respectively substantially perpendicular in cross section and are formed in intermediate point of said inclined portions, said step portions forming said bit engaging grooves in said screw, and
   a substantially conical bottom surface formed in the central portion where said inclined portions meet; said tamperproof screw being characterized in that:
   an inverted truncated cone shape hole portion that reaches said bottom surface is formed as a continuation, except for said step portions, of said inclined portions so that said open end edge portions of said bit engaging grooves take a maximum diameter of said inverted truncated cone shape hole portion, and
   a projecting portion is formed so as to protrude from a central portion of said bottom surface to a position above said step portions of said bit engaging grooves; and
a screwdriver bit characterized in that said screwdriver bit is comprised of:
   vane portions having substantially perpendicular end edge portions that engage with said step portions formed in intermediate point of said inclined portions of said bit engaging grooves of said tamperproof screw,
   a protruding portion formed by extending tip ends of said respective vane portions so as to conform to a shape of said inverted truncated cone shape hole portion and said inclined portions that extend from said step portions toward said central portion of said neck portion of said screw, and
   a hollow space formed in a center of a tip end of said protruding portion so that said projecting portion is guided thereinto.

8. The combination of a tamperproof screw and screwdriver bit according to claim 6 or 7, characterized in that said protruding portion on said bit tip end of said screwdriver bit is formed with an angle of inclination of substantially 20 to 30° with respect to an axis of said screwdriver bit.

9. A header punch for manufacturing a tamperproof screw, characterized in that said header punch is comprised of:
   projecting portions which have substantially perpendicular end edge portions and form perpendicular or recessed wall portions and step portions in end edge portions of bit engaging grooves in a screw head,
   a conical projecting portion which forms an inverted truncated cone shape hole portion and inclined portions in a central portion of said bit engaging grooves and to form a substantially conical bottom surface, and
   a cavity portion which is formed in a center of a tip end of said conical projecting portion and forms a projecting portion.

* * * * *